US012615208B2

(12) United States Patent (10) Patent No.: US 12,615,208 B2
Hu et al. (45) Date of Patent: Apr. 28, 2026

(54) METHOD FOR GENERATING ROUTING INFORMATION, METHOD FOR SENDING LOCATION INFORMATION, METHOD FOR FORWARDING PACKET, AND DEVICE

(71) Applicant: Huawei Technologies Co., Ltd., Shenzhen (CN)

(72) Inventors: Zhibo Hu, Beijing (CN); Guoqi Xu, Beijing (CN); Jie Dong, Beijing (CN); Juhua Xu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 505 days.

(21) Appl. No.: 18/174,995

(22) Filed: Feb. 27, 2023

(65) Prior Publication Data

US 2023/0216792 A1 Jul. 6, 2023

Related U.S. Application Data

(63) Continuation of application No. PCT/CN2021/113358, filed on Aug. 18, 2021.

(30) Foreign Application Priority Data

Aug. 31, 2020 (CN) .......................... 202010901424.0

(51) Int. Cl.
*H04L 45/74* (2022.01)
*H04L 45/02* (2022.01)
(52) U.S. Cl.
CPC .............. *H04L 45/74* (2013.01); *H04L 45/02* (2013.01)
(58) Field of Classification Search
None
See application file for complete search history.

(56) References Cited

U.S. PATENT DOCUMENTS 10,637,768 B1 * 4/2020 Joseph .................. H04L 45/127
2017/0085575 A1 * 3/2017 Wynn ................. H04L 63/0823
(Continued)

FOREIGN PATENT DOCUMENTS

CN 111541613 A 8/2020

OTHER PUBLICATIONS

P. Psenak, Ed. et al, "IGP Flexible Algorithm draft-ietf-lsr-flex-algo-07.txt", Network Working Group Internet-Draft, Intended status: Standards Track, Apr. 1, 2020, total 34 pages.
(Continued)

*Primary Examiner* — Phirin Sam
(74) *Attorney, Agent, or Firm* — Slater Matsil, LLP

(57) ABSTRACT

A first network device receives location information sent by a second network device. The location information includes a location identifier used to identify a location of the second network device in a network and a plurality of associated flexible algorithms corresponding to the location identifier. The first network device generates, based on a first flexible algorithm of the plurality of associated flexible algorithms, first routing information to the second network device. The first flexible algorithm corresponds to a first network topology, the first network topology is a network topology in which the first network device is located, and the first routing information is used to send a packet to the second network device in the first network topology. One location identifier corresponds to a plurality of associated flexible algorithms, and routing information in different network topologies is generated based on different associated flexible algorithms.

19 Claims, 15 Drawing Sheets

(56) References Cited

U.S. PATENT DOCUMENTS

| | | | | |
|---|---|---|---|---|
| 2020/0344151 A1* | 10/2020 | Joseph | .................... | H04L 45/34 |
| 2020/0396638 A1* | 12/2020 | Huang | .................. | H04W 72/12 |
| 2021/0153001 A1* | 5/2021 | Eisner | ..................... | H04W 4/90 |
| 2022/0232344 A1* | 7/2022 | Kim | ........................ | H04W 4/50 |

OTHER PUBLICATIONS

P. Psenak, Ed. et al: "IGP Flexible Algorithm draft-ietf-lsr-flex-algo-10.txt", Network Working Group Interet-Draft, Internet Engineering Task Force, IETF; Standard Working Draft Internet Society (ISOC) 4, Rue Des Falaises, No. 10, Aug. 19, 2020, pp. 1-36, XP015141132.
P. Psenak, Ed. et al, "IS-IS Extension to Support Segment Routing over IPv6 Dataplane draft-ietf-lsr-isis-srv6-extensions-08.txt", Network Working Group Internet-Draft, Intended status: Standards Track, Apr. 23, 2020, total 22 pages.
S Previdi et al: "IS-IS Extensions for Segment Routing draft-ietf-isis-segment-routing-extensions-18", IS-IS for IP Internets, Jun. 20, 2018, XP055673815, total 35 pages.

\* cited by examiner

4::/64 flex-algo 128
3::/64 flex-algo 129

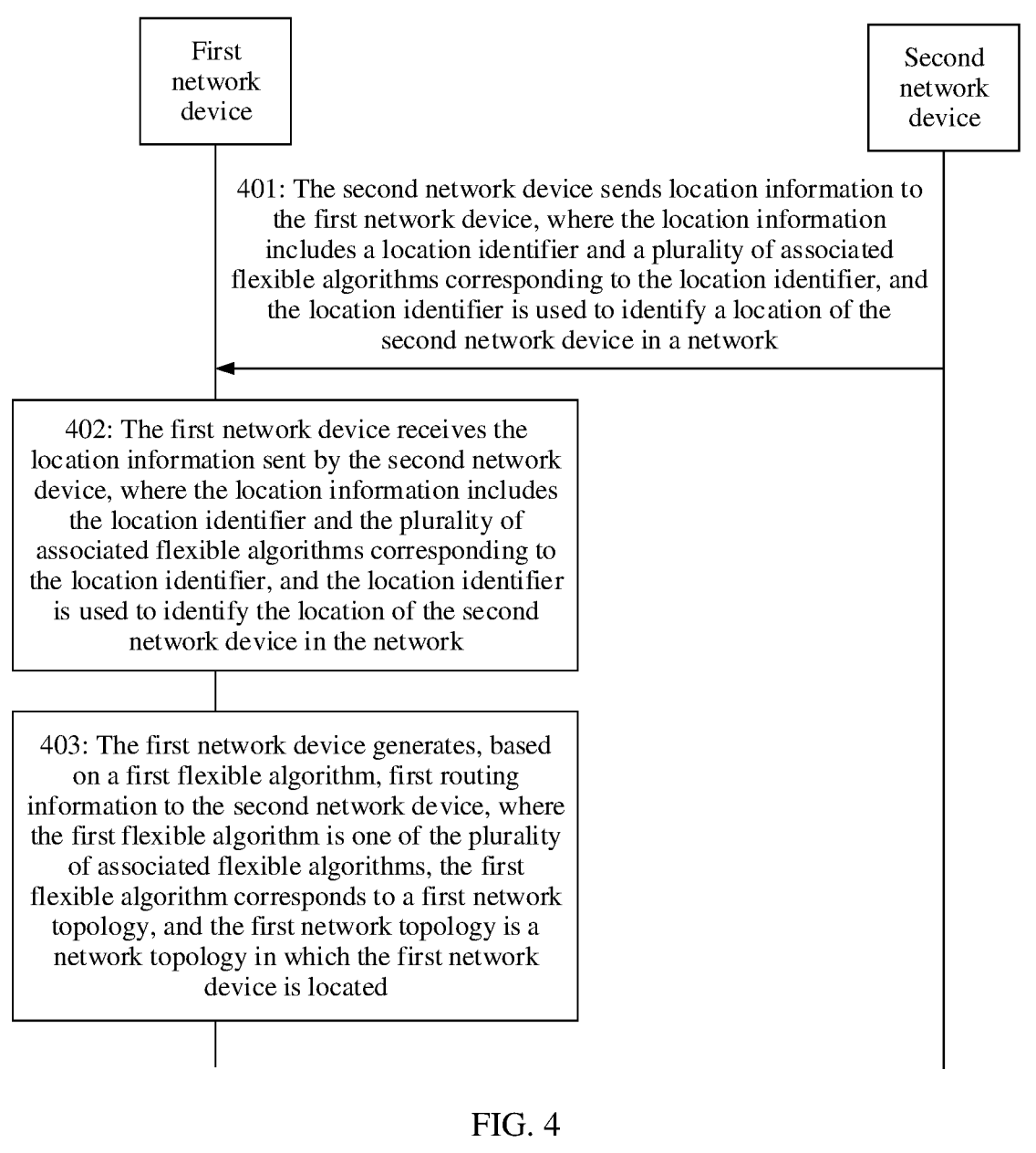

```
┌──────────┐                                              ┌──────────┐
│  First   │                                              │  Second  │
│ network  │                                              │ network  │
│  device  │                                              │  device  │
└────┬─────┘                                              └────┬─────┘
     │                                                         │
     │  401: The second network device sends location          │
     │  information to the first network device, where          │
     │  the location information includes a location            │
     │  identifier and a plurality of associated               │
     │  flexible algorithms corresponding to the location      │
     │  identifier, and the location identifier is used         │
     │  to identify a location of the second network            │
     │  device in a network                                    │
     │◄────────────────────────────────────────────────────────┤
```

401: The second network device sends location information to the first network device, where the location information includes a location identifier and a plurality of associated flexible algorithms corresponding to the location identifier, and the location identifier is used to identify a location of the second network device in a network 402: The first network device receives the location information sent by the second network device, where the location information includes the location identifier and the plurality of associated flexible algorithms corresponding to the location identifier, and the location identifier is used to identify the location of the second network device in the network 403: The first network device generates, based on a first flexible algorithm, first routing information to the second network device, where the first flexible algorithm is one of the plurality of associated flexible algorithms, the first flexible algorithm corresponds to a first network topology, and the first network topology is a network topology in which the first network device is located

FIG. 4

SRv6 location identifier (locator) definition

```
                    0                   1                   2                   3
                    0 1 2 3 4 5 6 7 8 9 0 1 2 3 4 5 6 7 8 9 0 1 2 3 4 5 6 7 8 9 0 1
                   +-+-+-+-+-+-+-+-+-+-+-+-+-+-+-+-+-+-+-+-+-+-+-+-+-+-+-+-+-+-+-+-+
                   |                          Metric (metric)                      |
                   +-+-+-+-+-+-+-+-+-+-+-+-+-+-+-+-+-+-+-+-+-+-+-+-+-+-+-+-+-+-+-+-+
                   |     Flag (flags)        |     Algorithm (algorithm)           |
                   +-+-+-+-+-+-+-+-+-+-+-+-+-+-+-+-+-+-+-+-+-+-+-+-+-+-+-+-+-+-+-+-+
                   | Location identifier size |   Location identifier (locator) (variable (variable))...
                   |      (Loc size)          |
                   +-+-+-+-+-+-+-+-+-+-+-+-+-+-+-+-+-+-+-+-+-+-+-+-+-+-+-+-+-+-+-+-+
                   | Sub-TLV length (Sub-tlv- |   Sub-TLV (sub-TLVs) (variable (variable))...
                   |          len)            |
                   +-+-+-+-+-+-+-+-+-+-+-+-+-+-+-+-+-+-+-+-+-+-+-+-+-+-+-+-+-+-+-+-+
```

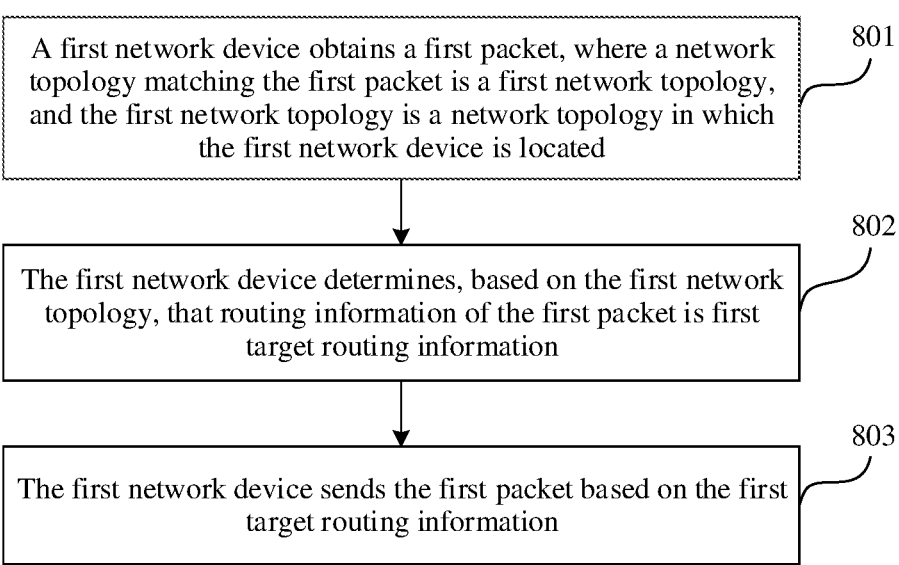

A first network device obtains a first packet, where a network topology matching the first packet is a first network topology, and the first network topology is a network topology in which the first network device is located    801

The first network device determines, based on the first network topology, that routing information of the first packet is first target routing information    802

The first network device sends the first packet based on the first target routing information    803

FIG. 8

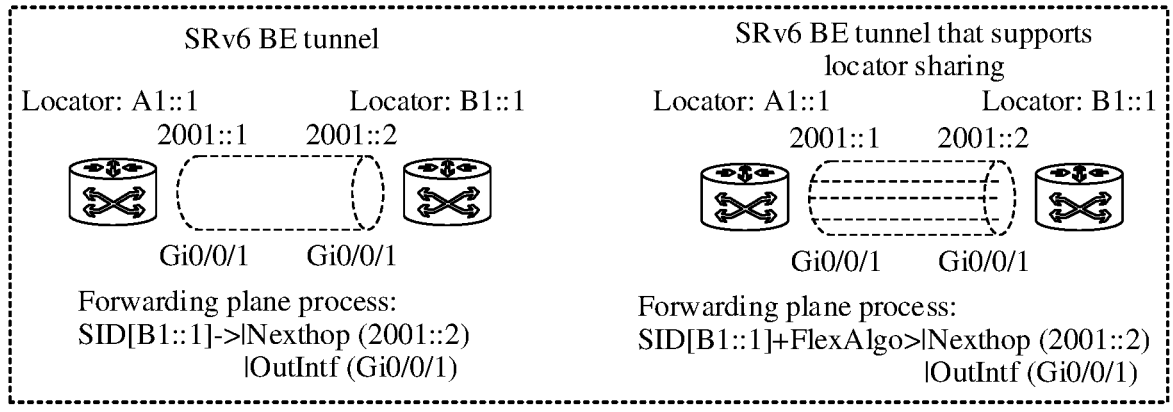

| | | SRv6 BE tunnel | | | | SRv6 BE tunnel that supports locator sharing | |
|---|---|---|---|---|---|---|---|

Locator: A1::1    Locator: B1::1
2001::1    2001::2
Gi0/0/1    Gi0/0/1

Forwarding plane process:
SID[B1::1]->|Nexthop (2001::2)
|OutIntf (Gi0/0/1)

Locator: A1::1    Locator: B1::1
2001::1    2001::2
Gi0/0/1    Gi0/0/1

Forwarding plane process:
SID[B1::1]+FlexAlgo>|Nexthop (2001::2)
|OutIntf (Gi0/0/1)

SRv6 BE

| Payload |
|---|
| GTP |
| IP (DSCP) |
| VLAN |
| ETH |

| Payload |
|---|
| GTP |
| IP (DSCP) |
| HBH TopoId |
| IPv6 head |
| ETH |

| Payload |
|---|
| GTP |
| IP (DSCP) |
| VLAN |
| ETH |

| Version (version) 11 | Traffic class (traffic class) | Flow label (flow label) | |
|---|---|---|---|
| Payload length (Pload length) | | Next (next) | Hop limit (hop limit) |
| Source address (source address) (A1::1) | | | |
| Destination address (destination address) (A2::11) | | | |
| Next header (next header) | Extension header length (Hdr Ext Len) | Slice (slice) ID | Flexible algorithm (Flexalgo) ID |
| Next header (next header) | Extension header length (Hdr Ext Len) | Routing type (routing type) = 4 | Segments left (segments left) = 2 |
| Last entry (last entry) | Flag (flags) | Tag (tag) | |
| Segment list (SegmentList) [1 to N] | | | |
| Payload (payload) | | | |

METHOD FOR GENERATING ROUTING INFORMATION, METHOD FOR SENDING LOCATION INFORMATION, METHOD FOR FORWARDING PACKET, AND DEVICE

CROSS-REFERENCE TO RELATED APPLICATIONS

This application is a continuation of International Application No. PCT/CN2021/113358, filed on Aug. 18, 2021, which claims priority to Chinese Patent Application No. 202010901424.0, filed on Aug. 31, 2020. The disclosures of the aforementioned applications are hereby incorporated by reference in their entireties.

TECHNICAL FIELD

This application relates to the field of communication technologies, and in particular, to a method for generating routing information, a method for sending location information, a method for forwarding a packet, and a device.

BACKGROUND

With development of communication technologies, to meet increasing service requirements, a network slicing technology for on-demand networking emerges. Network slicing is essentially dividing a physical network of an operator into a plurality of virtual networks. Each virtual network corresponds to one network topology. In addition, division is performed based on different service requirements, such as a delay, a bandwidth, security, and reliability, to flexibly cope with different network application scenarios. How to perform network slicing to define a virtual network, how to route traffic in a network topology corresponding to the virtual network, and how to forward a packet in the network topology are keys to meeting a service requirement.

In a related technology, algorithm identifiers (ID) of flexible algorithms (flex-algoes) and a series of constraints thereof are used for division into network topologies and route computation, to implement virtual network switching. In addition, each flexible algorithm needs an independent location identifier (locator). To be specific, the locator is bound to the flexible algorithm for issuance, and one locator corresponds to only one flexible algorithm.

When division into a large quantity of topologies needs to be performed on a network based on flexible algorithms, a large quantity of locator prefixes are required. This consumes a large amount of internet protocol version 6 (IPv6) address prefix space and network resources.

SUMMARY

Embodiments of this application provide a method for generating routing information, a method for sending location information, a method for forwarding a packet, and a device, to resolve a problem provided in a related technology. The technical solutions are as follows:

According to a first aspect, a method for generating routing information is provided. For example, a first network device performs the method. The first network device receives location information sent by a second network device. The location information includes a location identifier and a plurality of associated flexible algorithms corresponding to the location identifier, and the location identifier is used to identify a location of the second network device in a network. The first network device generates, based on a first flexible algorithm, first routing information to the second network device. The first flexible algorithm is one of the plurality of associated flexible algorithms, the first flexible algorithm corresponds to a first network topology, the first network topology is a network topology in which the first network device is located, and the first routing information is used to send a packet to the second network device in the first network topology.

One location identifier and a plurality of corresponding associated flexible algorithms are included in location information and sent to the first network device. The first network device generates routing information in different network topologies based on different associated flexible algorithms. Compared with a case in which one location identifier carries one flexible algorithm, in this case, in a process of generating the routing information, address space is reduced, and network resources are saved.

In a possible implementation, the plurality of associated flexible algorithms further include a second flexible algorithm. The first network device generates, based on the second flexible algorithm, second routing information to the second network device. The second routing information corresponds to a second network topology, the second network topology is a network topology in which the first network device is located, and the second routing information is used to send a packet to the second network device in the second network topology.

In a possible implementation, the first routing information corresponds to an identifier of the first network topology. The first routing information corresponds to the identifier of the first network topology, so that routing information in a same network topology can correspond to a same identifier of the network topology.

In a possible implementation, the first routing information includes an identifier of the first network topology. Because the identifier of the first network topology is included in the first routing information, routing information of network topologies can still be distinguished even if the routing information is in one forwarding table. This saves space of the forwarding table.

According to a second aspect, a method for sending location information is provided. For example, a second network device performs the method. The second network device sends location information to a first network device. The location information includes a location identifier and a plurality of associated flexible algorithms corresponding to the location identifier, the location identifier is used to identify a location of the second network device in a network, a first flexible algorithm in the plurality of associated flexible algorithms is used by the first network device to generate first routing information to the second network device, the first flexible algorithm corresponds to a first network topology, the first network topology is a network topology in which the first network device is located, and the first routing information is used by the first network device to send a packet to the second network device in the first network topology.

Because a plurality of flexible algorithms are carried in a structure of one location identifier, compared with a case in which one network device supports a plurality of flexible algorithms but one location identifier carries only one flexible algorithm, and therefore a plurality of location identifiers are required to carry the plurality of flexible algorithms, in this case, the plurality of flexible algorithms are carried in one location identifier and encapsulated in location information for sending, so that address space is reduced, occupied packet space is reduced, and network bandwidth resources are saved.

In a possible implementation, the plurality of associated flexible algorithms further include a second flexible algorithm. The second flexible algorithm is used by the first network device to generate second routing information to the second network device. The second routing information corresponds to a second network topology. The second network topology is a network topology in which the first network device is located. The second routing information is used to send a packet to the second network device in the second network topology.

According to a third aspect, a method for forwarding a packet is provided. For example, a first network device performs the method. The first network device obtains a first packet. A network topology matching the first packet is a first network topology, and the first network topology is a network topology in which the first network device is located. Then, the first network device determines first routing information based on the first network topology. The first routing information is used to send the first packet in the first network topology. The first network device sends the first packet based on the first routing information.

Because one location identifier and a plurality of corresponding associated flexible algorithms are included in location information, the first network device generates routing information in different network topologies based on different associated flexible algorithms. This reduces IPv6 address space and saves network resources in a process of generating the routing information. On this basis, after the first packet is obtained, the first routing information used to forward the first packet is determined based on the first network topology matching the first packet, so that the first packet is sent in the first network topology. This implements a manner of forwarding a packet based on a network topology.

In a first possible implementation of the third aspect, that the first network device obtains a first packet includes the following. The first network device obtains a second packet. The first network device adds an identifier of the first network topology to the second packet, to obtain the first packet. This implementation may be performed by a head node in the network topology. The identifier of the first network topology is added to the second packet, so that a network device receiving the first packet can determine, based on the identifier of the first network topology, that a network device matching the first packet is the first network device, so as to determine corresponding routing information.

In a second possible implementation of the third aspect, that the first network device adds an identifier of the first network topology to the second packet, to obtain the first packet includes: The first network device adds the identifier of the first network topology to a hop-by-hop HBH field of the second packet, to obtain the first packet.

In a third possible implementation of the third aspect, that the first network device adds an identifier of the first network topology to the second packet, to obtain the first packet includes: The first network device adds a segment identifier including the identifier of the first network topology to a segment identifier list of the second packet, to obtain the first packet.

In a fourth possible implementation of the third aspect, that the first network device adds an identifier of the first network topology to the second packet, to obtain the first packet includes: The first network device adds the identifier of the first network topology and an identifier of a first resource to the second packet, to obtain the first packet. The first resource is a resource in the first network topology, and the identifier of the first resource is used to indicate to send the first packet in the first network topology by using the first resource.

In a fifth possible implementation of the third aspect, that the first network device adds an identifier of the first network topology to the second packet, to obtain the first packet includes: The first network device determines, based on a destination address of the second packet, that a flexible algorithm matching the second packet is a first flexible algorithm. The first flexible algorithm corresponds to the first network topology. The first network device determines that a network topology matching the second packet is the first network topology. Alternatively, the first network device determines that a destination address of the second packet matches a specified destination address. The specified destination address matches the first network topology. The first network device determines that a network topology matching the second packet is the first network topology. The head node in the network topology determines, based on a destination address in a packet, an identifier of the network topology corresponding to the packet, and then adds the identifier of the network topology to the packet, so that a transit node obtains the identifier of the network topology from the packet.

In a sixth possible implementation of the third aspect, that the first network device obtains a first packet includes the following. The first network device receives the first packet. The first network device determines that the network topology matching the first packet is the first network topology. This implementation may be performed by a transit node in the network topology. After receiving the first packet, the transit node determines the network topology matching the first packet, and then determines, based on the network topology, routing information corresponding to the first packet.

In a seventh possible implementation of the third aspect, that the first network device determines that the network topology matching the first packet is the first network topology includes: The first network device determines, based on a destination address of the first packet, that a flexible algorithm matching the first packet is a first flexible algorithm. The first flexible algorithm corresponds to the first network topology. The first network device determines that the network topology matching the first packet is the first network topology. Alternatively, the first network device determines that a destination address of the first packet matches a specified destination address. The specified destination address matches the first network topology. The first network device determines that the network topology matching the first packet is the first network topology.

In an eighth possible implementation of the third aspect, the first packet includes an identifier of the first network topology. That the first network device determines that the network topology matching the first packet is the first network topology includes the following. The first network device determines, based on the identifier of the first network topology included in the first packet, that the network topology matching the first packet is the first network topology. This implementation may be performed by a transit node in the network topology. When a head node in the network topology has added an identifier of the network topology to the packet, after receiving the first packet, the transit node reads the identifier of the network topology in the first packet, to determine the network topology matching the first packet.

In a ninth possible implementation of the third aspect, the first packet further includes an identifier of a first resource, and the first resource is a resource in the first network topology. That the first network device sends the first packet based on the first routing information includes: The first network device sends the first packet in the first network topology based on the first routing information and by using the first resource.

In a tenth possible implementation of the third aspect, the first routing information corresponds to the identifier of the first network topology. That the first network device determines first routing information based on the first network topology includes the following. The first network device determines the first routing information based on a correspondence between the first routing information and the identifier of the first network topology.

In an eleventh possible implementation of the third aspect, the identifier of the first network topology is included in the first routing information. That the first network device determines first routing information based on the first network topology includes: The first network device determines the first routing information based on the identifier of the first network topology included in the first routing information.

According to a fourth aspect, an apparatus for generating routing information is provided. The apparatus includes: a receiving module, configured to receive location information sent by a second network device, where the location information includes a location identifier and a plurality of associated flexible algorithms corresponding to the location identifier, and the location identifier is used to identify a location of the second network device in a network; and a generation module, configured to generate, based on a first flexible algorithm, first routing information to the second network device, where the first flexible algorithm is one of the plurality of associated flexible algorithms, the first flexible algorithm corresponds to a first network topology, the first network topology is a network topology in which the apparatus for generating routing information is located, and the first routing information is used to send a packet to the second network device in the first network topology.

In a possible implementation, the plurality of associated flexible algorithms further include a second flexible algorithm. The generation module is further configured to generate, based on the second flexible algorithm, second routing information to the second network device. The second routing information corresponds to a second network topology, the second network topology is a network topology in which the apparatus for generating routing information is located, and the second routing information is used to send a packet to the second network device in the second network topology.

In a possible implementation, the first routing information corresponds to an identifier of the first network topology.

In a possible implementation, the first routing information includes an identifier of the first network topology.

According to a fifth aspect, an apparatus for sending location information is provided. The apparatus includes: a sending module, configured to send location information to a first network device, where the location information includes a location identifier and a plurality of associated flexible algorithms corresponding to the location identifier, the location identifier is used to identify a location, in a network, of the apparatus for sending location information, a first flexible algorithm in the plurality of associated flexible algorithms is used by the first network device to generate first routing information to a second network device, the first flexible algorithm corresponds to a first network topology, the first network topology is a network topology in which the first network device is located, and the first routing information is used by the first network device to send, in the first network topology, a packet to the apparatus for sending location information.

In a possible implementation, the plurality of associated flexible algorithms further include a second flexible algorithm. The second flexible algorithm is used by the first network device to generate second routing information to the apparatus for sending location information. The second routing information corresponds to a second network topology. The second network topology is a network topology in which the first network device is located. The second routing information is used to send, in the second network topology, a packet to the apparatus for sending location information.

According to a sixth aspect, an apparatus for forwarding a packet is provided. The apparatus includes: an obtaining module, configured to obtain a first packet, where a network topology matching the first packet is a first network topology, and the first network topology is a network topology in which the apparatus for forwarding a packet is located; a determining module, configured to determine first routing information based on the first network topology, where the first routing information is used to send the first packet in the first network topology; and a sending module, configured to send the first packet based on the first routing information.

In a possible implementation, the obtaining module is configured to: obtain a second packet; and add an identifier of the first network topology to the second packet, to obtain the first packet.

In a possible implementation, the obtaining module is configured to add the identifier of the first network topology to a hop-by-hop HBH field of the second packet, to obtain the first packet.

In a possible implementation, the obtaining module is configured to add a segment identifier including the identifier of the first network topology to a segment identifier list of the second packet, to obtain the first packet.

In a possible implementation, the obtaining module is configured to add the identifier of the first network topology and an identifier of a first resource to the second packet, to obtain the first packet. The first resource is a resource in the first network topology, and the identifier of the first resource is used to indicate to send the first packet in the first network topology by using the first resource.

In a possible implementation, the obtaining module is configured to: determine, based on a destination address of the second packet, that a flexible algorithm matching the second packet is a first flexible algorithm, where the first flexible algorithm corresponds to the first network topology, and determine that a network topology matching the second packet is the first network topology; or determine that a destination address of the second packet matches a specified destination address, where the specified destination address matches the first network topology, and determine that a network topology matching the second packet is the first network topology.

In a possible implementation, the obtaining module is configured to: receive the first packet; and determine that the network topology matching the first packet is the first network topology.

In a possible implementation, the determining module is configured to determine, based on a destination address of the first packet, that a flexible algorithm matching the first packet is a first flexible algorithm, where the first flexible algorithm corresponds to the first network topology, and determine that the network topology matching the first packet is the first network topology; or determine that a destination address of the first packet matches a specified destination address, where the specified destination address matches the first network topology, and determine that the network topology matching the first packet is the first network topology.

In a possible implementation, the first packet includes an identifier of the first network topology. The determining module is configured to determine, based on the identifier of the first network topology included in the first packet, that the network topology matching the first packet is the first network topology.

In a possible implementation, the first packet further includes an identifier of a first resource, and the first resource is a resource in the first network topology.

The sending module is configured to send the first packet in the first network topology based on the first routing information and by using the first resource.

In a possible implementation, the first routing information corresponds to the identifier of the first network topology.

The determining module is configured to determine the first routing information based on a correspondence between the first routing information and the identifier of the first network topology.

In a possible implementation, the identifier of the first network topology is included in the first routing information.

The determining module is configured to determine the first routing information based on the identifier of the first network topology included in the first routing information.

According to a seventh aspect, a network device is provided. The network device includes: a memory and a processor. The memory stores at least one instruction, and the at least one instruction is loaded and executed by the processor, to implement the method for generating routing information according to any one of the first aspect and the implementations, or implement the method for sending location information according to any one of the second aspect and the implementations, or implement the method for forwarding a packet according to any one of the third aspect and the implementations.

According to an eighth aspect, a communication system is provided. The communication system includes a first network device and a second network device. The first network device is configured to perform the method for generating routing information according to any one of the first aspect and the implementations. The second network device is configured to perform the method for sending location information according to any one of the third aspect and the implementations.

According to a ninth aspect, a communication system is provided. The communication system includes a first network device and a second network device. The first network device is configured to perform the method for forwarding a packet according to any one of the third aspect and the first to the fifth implementations of the third aspect. The second network device is configured to perform the method for forwarding a packet according to any one of the third aspect and the sixth to the eleventh implementations of the third aspect.

According to a tenth aspect, a computer-readable storage medium is provided. The storage medium stores at least one instruction, and the instruction is loaded and executed by a processor to implement the method for generating routing information according to any one of the first aspect and the implementations, or implement the method for sending location information according to any one of the second aspect and the implementations, or implement the method for forwarding a packet according to any one of the third aspect and the implementations.

Another communication apparatus is provided. The apparatus includes: a transceiver, a memory, and a processor. The transceiver, the memory, and the processor communicate with each other by using an internal connection path. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to any one of the first aspect to the third aspect or the possible implementations of the first aspect to the third aspect.

In an example embodiment, there are one or more processors, and there are one or more memories.

In an example embodiment, the memory may be integrated with the processor, or the memory and the processor are disposed separately.

In a specific implementation process, the memory may be a non-transitory memory, such as a read-only memory (ROM). The memory and the processor may be integrated into one chip, or may be separately disposed on different chips. A type of the memory and a manner of disposing the memory and the processor are not limited in this embodiment of this application.

A computer program (product) is provided. The computer program (product) includes: computer program code. When the computer program code is run by a computer, the computer is enabled to perform the methods in the foregoing aspects.

A chip is provided. The chip includes a processor, configured to invoke, from a memory, instructions stored in the memory and run the instructions, to enable a communication device on which the chip is installed to perform the methods in the foregoing aspects.

Another chip is provided. The chip includes: an input interface, an output interface, a processor, and a memory. The input interface, the output interface, the processor, and the memory are connected to each other by using an internal connection path. The processor is configured to execute code in the memory. When the code is executed, the processor is configured to perform the methods in the foregoing aspects.

BRIEF DESCRIPTION OF THE DRAWINGS

FIG. 4 is a schematic flowchart of a method for sending location information and a method for generating routing information according to an embodiment of this application;

FIG. 5A to FIG. 5C are a schematic diagram of structures of a location identifier and an END.X according to an embodiment of this application;

FIG. 8 is a schematic flowchart of a method for forwarding a packet according to an embodiment of this application;

FIG. 9 is a schematic diagram of a process of forwarding a packet according to an embodiment of this application;

DETAILED DESCRIPTION OF ILLUSTRATIVE EMBODIMENTS

Terms used in an implementation part of this application are merely used to explain embodiments of this application, and are not intended to limit this application.

As service requirements and application scenarios are increasingly diverse, a network slicing technology is gradually widely used. In the network slicing technology, a physical network of an operator is divided into a plurality of virtual networks. Each virtual network corresponds to one network topology. In addition, division is performed based on different service requirements, such as a delay, a bandwidth, security, and reliability, to flexibly cope with different network application scenarios.

A scenario of segment routing over an IPv6 forwarding plane (segment routing IPv6, SRv6) is used as an example. In a related technology, a method for performing network topology division and route computation by using algorithm identifiers (IDs) and a series of constraints thereof is provided. The SRv6 is a protocol designed based on a concept of source routing to forward an IPv6 data packet on a network. In the SRv6, a routing extension header (segment routing header, SRH) is inserted to an IPv6 packet, an explicit IPv6 address stack is pushed into the SRH, and hop-by-hop forwarding is completed by transit nodes by continuously updating a destination address and offsetting the address stack.

Figure 1:
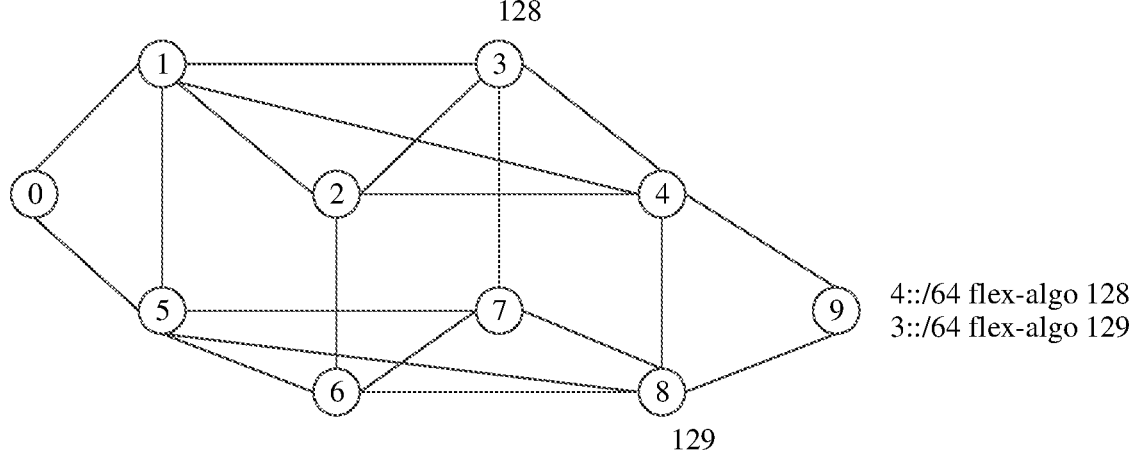
FIG. 1 is a schematic diagram of a system architecture according to a related technology.

A system architecture shown in FIG. 1 is used as an example. The system architecture includes network devices such as a node 0 to a node 9. Nodes 0, 1, 2, 3, 4, and 9 participate in route computation using a flexible algorithm 128, and nodes 0, 5, 6, 7, 8, and 9 participate in route computation using a flexible algorithm 129. For example, the node 0 is a first network device, and the node 9 is a second network device. The node 9 issues two location identifiers (locators): One is a 4::/64 locator based on the flexible algorithm 128, and the other is a 3::/64 locator based on the flexible algorithm 129.

When computing routing information to the 4::/64 locator, the node 0 computes the routing information based on a node and a link that are specified in the flexible algorithm 128 according to a shortest path first (SPF) algorithm or a strict-SPF algorithm. For example, based on a system shown in FIG. 1, a path to the 4::/64 locator is 0→1→2→4→9. Similarly, when the node 0 computes routing information to the 3::/64 locator, a path to the 3::/64 locator is 0→5→6→8→9.

Figure 2:
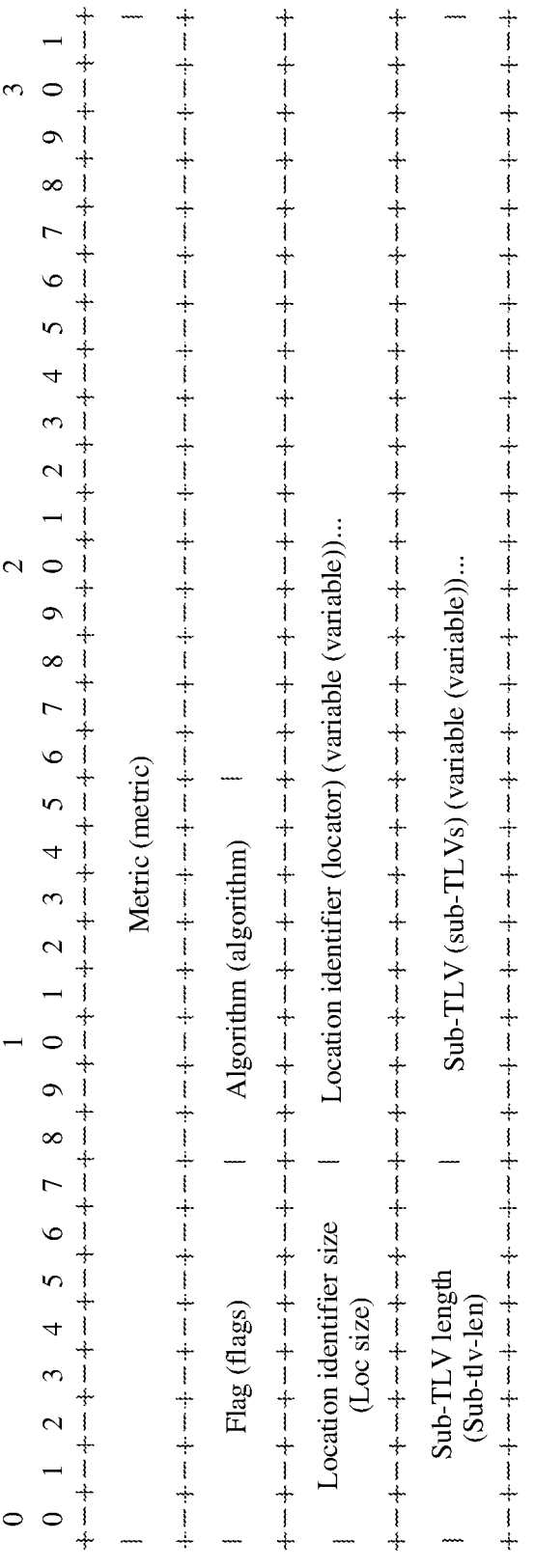
FIG. 2 is a schematic diagram of a structure of a location identifier according to a related technology.

In a method for generating routing information according to the related technology, each algorithm needs an independent locator. For an extension of an SRv6 protocol in an interior gateway protocol (IGP), intermediate system to intermediate system (ISIS) is used as an example, and a structure of the locator is shown in FIG. 2. According to a definition of the locator shown in FIG. 2, when division into a large quantity of topologies needs to be performed on a network based on a flex-algo, a large quantity of locator prefixes are required. This consumes a large amount of IPv6 address prefix space and increases complexity.

In addition, an end (END) segment identifier (SID) of a node and a link END.X SID are allocated based on the locator. When there are a large quantity of locators, a large quantity of END SIDs and END.Xs are allocated. These locators, that is, the END SIDs and the END.X SIDs are encapsulated in an ISIS label switching path (LSP) packet. This occupies a large amount of packet space. In addition, the LSP is flooded in the network, causing a waste of bandwidth resources of the network.

In view of this, embodiments of this application provide a method for sending location information and a method for generating routing information. In the methods, a correspondence between a network slice and a network topology is configured, so that one locator can carry a plurality of flex-algoes, to avoid a waste of IPv6 address space and network resources. For example, the methods are applied to a system architecture shown in FIG. 3. A same locator 1::/64 on an edge device (provider edge, PE) 2 may carry a plurality of flex-algoes, which are flexible algorithms whose algorithm IDs are 128, 129, 130, and 0. The flexible algorithm whose algorithm ID is 0 is a default algorithm. In the method for sending location information, the PE2 encapsulates the locator and flex-algo information corresponding to the locator into an ISIS LSP packet, and floods the packet in a network, so that each node has information about the locator on the PE2.

Figure 3:
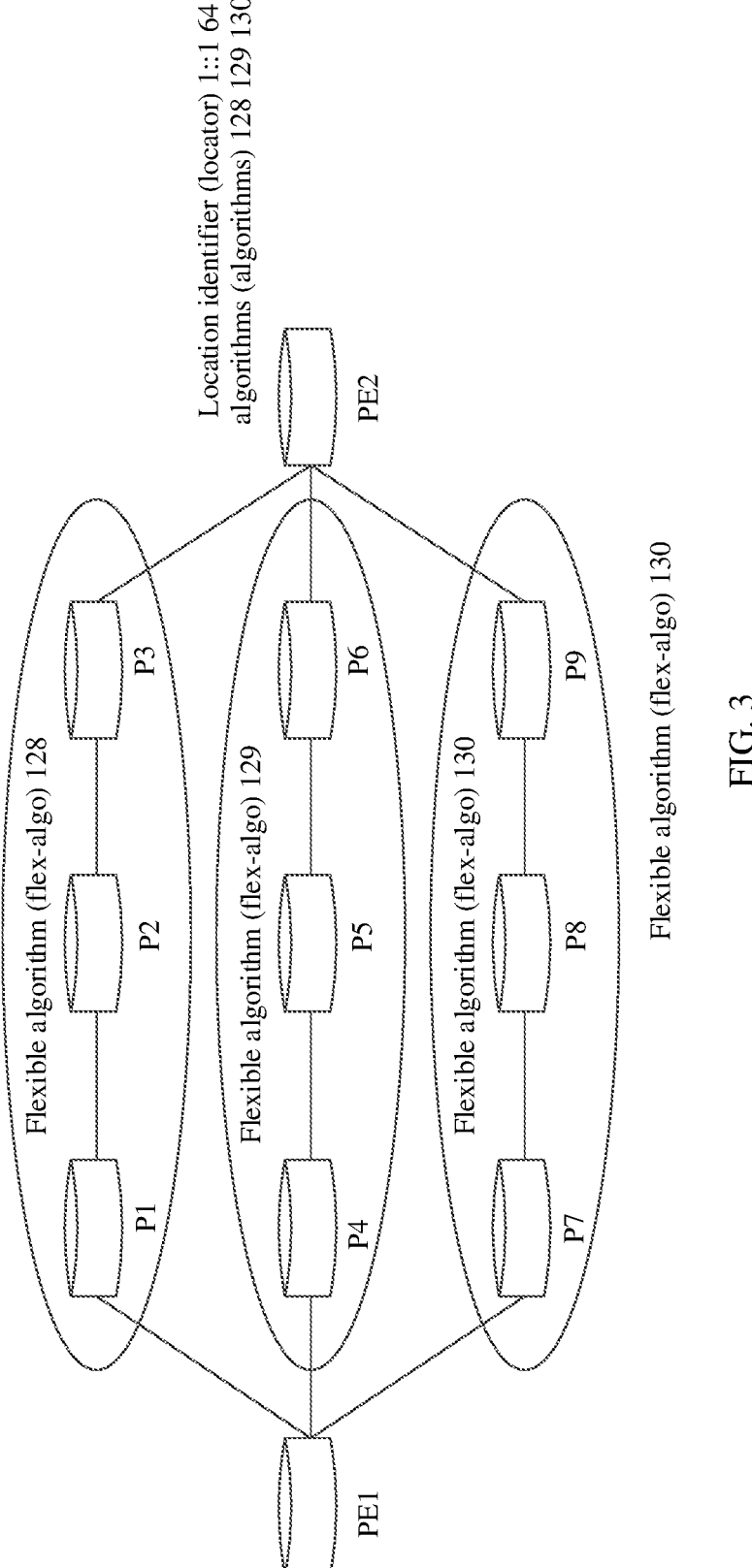
FIG. 3 is a schematic diagram of a system architecture according to an embodiment of this application.

As shown in FIG. 3, nodes PE1 and PE2 participate in path computation using the flexible algorithms whose algorithm IDs are 128, 129, and 130, nodes P1, P2, and P3 participate in path computation using the flexible algorithm whose algorithm ID is 128, nodes P4, P5, and P6 participate in path computation using the flexible algorithm whose algorithm ID is 129, and nodes P7, P8, and P9 participate in path computation using the flexible algorithm whose algorithm ID is 130. Therefore, when routing information is generated, the nodes PE1, P1, P2, P3, and PE2 may compute routing information to the locator 1::/64 based on the flexible algorithms whose algorithm IDs are 128 and 0. For example, the nodes PE1, P1, P2, P3, and PE2 each generate a unicast route to 1::/64 in network topologies corresponding to the flexible algorithms whose algorithm IDs are 128 and 0. Similarly, the nodes PE1, P4, P5, P6, and PE2 each generate a unicast route to 1::/64 in network topologies corresponding to the flexible algorithms whose algorithm IDs are 129 and 0. The nodes PE1, P7, P8, P9, and PE2 each generate a unicast route to 1::/64 in topologies corresponding to the flexible algorithms whose algorithm IDs are 130 and 0.

The following uses the system architecture shown in FIG. 3 as an example, to describe the method for sending location information and the method for generating routing information according to embodiments of this application. With reference to FIG. 4, a method for sending location information according to an embodiment of this application includes the following process.

401: A second network device sends location information to a first network device, where the location information includes a location identifier and a plurality of associated flexible algorithms corresponding to the location identifier, and the location identifier is used to identify a location of the second network device in a network.

In an example embodiment, after a locator is allocated to the second network device, the locator and a flexible algorithm corresponding to the locator may be carried in an ISIS LSP packet for flooding in the network, so that the second network device sends the location information to the first network device. In this embodiment of this application, a same locator may use a plurality of flexible algorithms to extend corresponding location information in the network. Therefore, when the second network device supports a plurality of flexible algorithms, the plurality of flexible algorithms may be used as associated flexible algorithms and carried together with the locator in the ISIS LSP packet for flooding in the network. The location information sent by the second network device to the first network device includes the location identifier and the plurality of associated flexible algorithms corresponding to the location identifier. The location identifier is used to identify the location of the second network device in the network.

In this embodiment of this application, a quantity of the associated flexible algorithms corresponding to the location identifier in the location information is not limited, and may be limited based on an application scenario. If the second network device supports a large quantity of flexible algorithms, the plurality of flexible algorithms may all correspond to one locator; or some of the flexible algorithms may correspond to one locator, and the remaining flexible algorithms may correspond to another locator. When a quantity of locators is less than a quantity of flexible algorithms, an objective of saving space and network resources can still be achieved in this case compared with a case in which one locator corresponds to one flexible algorithm.

In an example embodiment of this application, for a case in which one locator corresponds to a plurality of flexible algorithms, based on a structure of a locator shown in FIG. 2, an algorithm sub-TLV may be added to a TLV field of the locator, and the plurality of flexible algorithms are carried in the TLV field of the locator in a form of a sub-TLV. In addition, when an END SID or an END.X SID is generated, an algorithm sub-TLV may also be added to the TLV field of the locator, and the plurality of flexible algorithms are carried in the TLV field of the locator in the form of a sub-TLV.

Figure 5B:
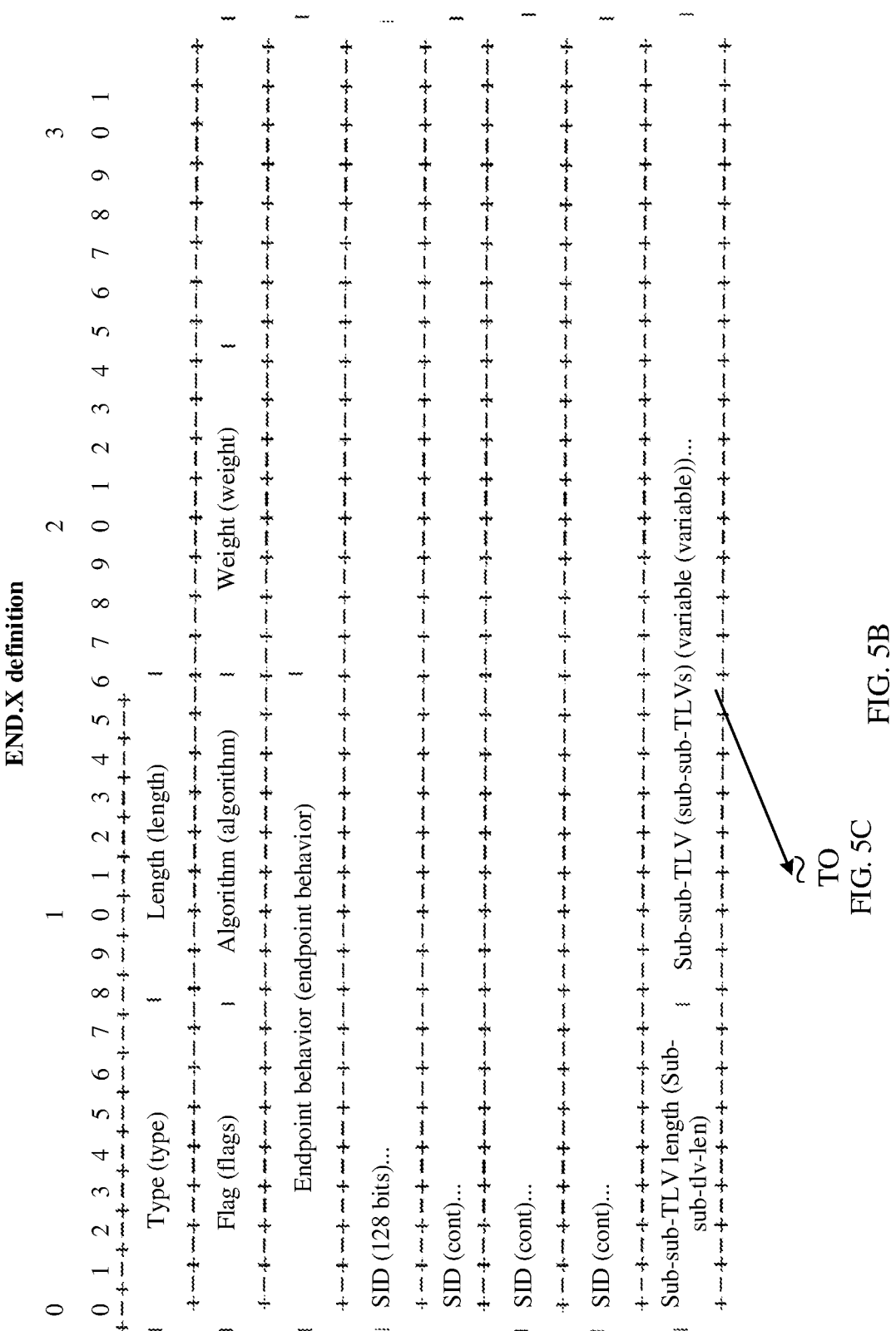
Figure 5C:
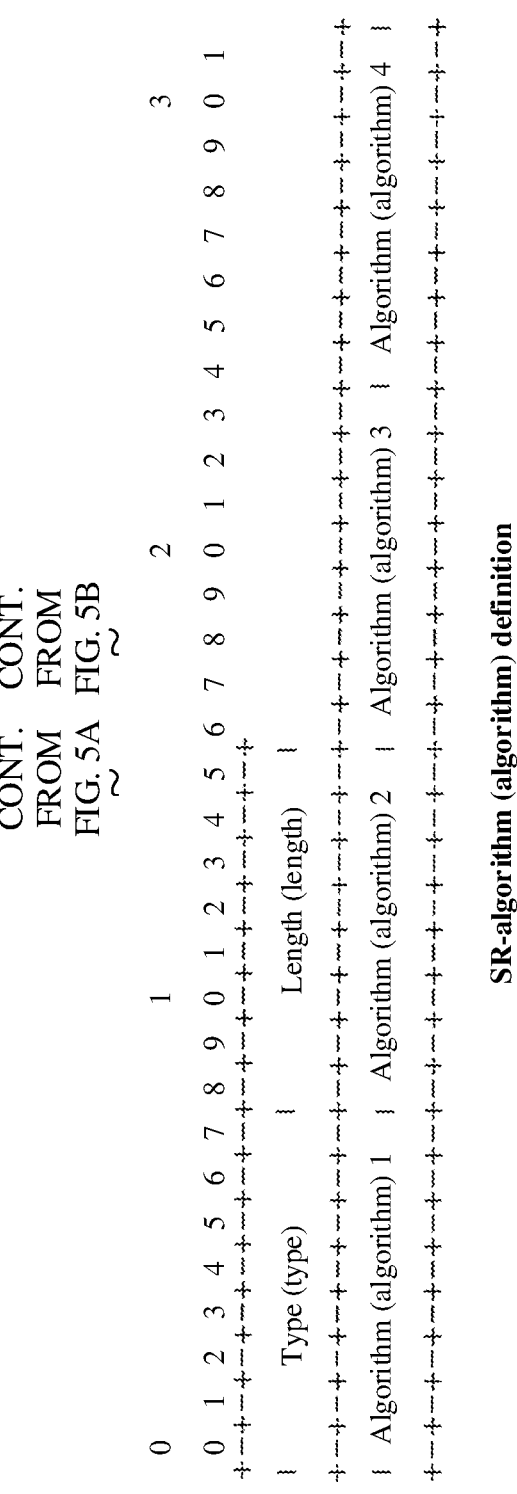

For example, the structure of the locator and a structure of the END.X SID according to this embodiment of this application may be shown in FIG. 5A to FIG. 5C. It can be easily learned from FIG. 5A to FIG. 5C that, because a plurality of flexible algorithms are carried in a structure of one locator, compared with a case in which one network device supports a plurality of flexible algorithms but one locator carries only one flexible algorithm, and therefore a plurality of locators are required to carry the plurality of flexible algorithms, in this case, the plurality of flexible algorithms are carried in one locator and encapsulated in an ISIS LSP packet, so that the method provided in this embodiment of this application can be used to reduce occupied packet space. In addition, when the ISIS LSP packet is flooded, bandwidth resources of a network can be further saved.

Based on the method for sending location information in 401 shown in FIG. 4, with reference to FIG. 4, a method for generating routing information according to an embodiment of this application includes the following several processes.

402: The first network device receives the location information sent by the second network device, where the location information includes the location identifier and the plurality of associated flexible algorithms corresponding to the location identifier, and the location identifier is used to identify the location of the second network device in the network.

For example, the first network device obtains, by receiving the ISIS LSP packet flooded by the second network device in the network, the location information sent by the second network device.

The system architecture shown in FIG. 3 is used as an example. The second network device is a node PE2, and the first network device is nodes PE1, P1, P2, P3, P4, P5, P6, P7, P8, and P9. The node PE2 encapsulates a locator 1::1/64 and flexible algorithms flex-algoes 128, 129, and 130 corresponding to the locator 1::1/64 into an ISIS LSP packet, and floods the ISIS LSP packet in the network. The nodes PE1, P1, P2, P3, P4, P5, P6, P7, P8 and P9 can all receive location information including the locator 1::1/64 and the flexible algorithms flex-algoes 128, 129, and 130 corresponding to the locator 1::1/64.

403: The first network device generates, based on a first flexible algorithm, first routing information to the second network device, where the first flexible algorithm is one of the plurality of associated flexible algorithms, the first flexible algorithm corresponds to a first network topology, and the first network topology is a network topology in which the first network device is located.

The first routing information is used to send a packet to the second network device in the first network topology. Because each of the plurality of associated flexible algorithms corresponds to one network topology, the first network device determines a flexible algorithm corresponding to the network topology in which the first network device is located, that is, determines the first flexible algorithm, and therefore generates, based on the first flexible algorithm, the first routing information to the second network device.

It should be noted that, if the first network device is in a plurality of network topologies, and one flexible algorithm corresponds to one network topology in which the first network device is located, the plurality of associated flexible algorithms further include a second flexible algorithm in addition to the first flexible algorithm. In addition to generating, based on the first flexible algorithm corresponding to the first network topology, the first routing information to the second network device, the first network device further generates, based on the second flexible algorithm, second routing information to the second network device. The second routing information corresponds to a second network topology, the second network topology is a network topology in which the first network device is located, and the second routing information is used to send a packet to the second network device in the second network topology.

The foregoing descriptions use only an example in which the first network device is in the first network topology corresponding to the first flexible algorithm and the second network topology corresponding to the second flexible algorithm, and do not limit the method provided in this embodiment of this application. In addition, the first network device may further generate routing information in more network topologies. A method for generating the routing information is the same as the method for generating routing information in this embodiment of this application. Details are not described herein again.

The system architecture shown in FIG. 3 is still used as an example. For a case in which the first network device is the node PE1, and a network topology in which the node PE1 is located corresponds to the flexible algorithms whose algorithm IDs are 128, 129, and 130, the node PE1 separately generates, based on the flexible algorithms whose algorithm IDs are 128, 129, and 130, target routing information to the second network device, so that three pieces of target routing information can be obtained. For a case in which the first network device is the node P1, because a network topology in which the node P1 is located corresponds to the flexible algorithm whose algorithm ID is 128, the node P1 generates, based on the flexible algorithm whose algorithm ID is 128, target routing information to the second network device, so that one piece of routing information can be obtained. Because the nodes P2 and P3 are in a same network topology as the node P1, similar to the node P1, the nodes P2 and P3 generate, based on the flexible algorithm whose algorithm ID is 128, target routing information to the second network device. For the nodes P4, P5, and P6 in a same network topology, target routing information to the second network device is generated based on the flexible algorithm whose algorithm ID is 129. For the nodes P7, P8, and P9 in a same network topology, target routing information to the second network device is generated based on the flexible algorithm whose algorithm ID is 130.

A manner in which the first network device generates, based on the first flexible algorithm, the first routing information to the second network device is not limited in this embodiment of this application. Because one locator corresponds to a plurality of flexible algorithms, to subsequently send, in a network topology, a packet to the second network device based on the computed target routing information, the network topology is associated with a network slice in the method provided in this embodiment of this application. In this case, the first routing information obtained through computation includes but is not limited to the following two cases.

Case 1: The first routing information corresponds to an identifier of the first network topology.

In the case 1, the first routing information includes but is not limited to a prefix, a next hop, an outbound interface, and a cost. The first routing information corresponds to the identifier of the first network topology, so that a network slice is associated with the first network topology. For a plurality of pieces of routing information of a same network topology, the plurality of pieces of routing information of the same network topology correspond to a same network topology identifier. For example, the plurality of pieces of routing information may be placed in a same forwarding table, and a table ID is set for the forwarding table. The table ID is an ID of the network topology. Therefore, the routing information in the same network topology corresponds to the same network topology identifier. For example, an identifier of a network topology may be consistent with an ID of a flexible algorithm corresponding to the network topology.

Figure 6:
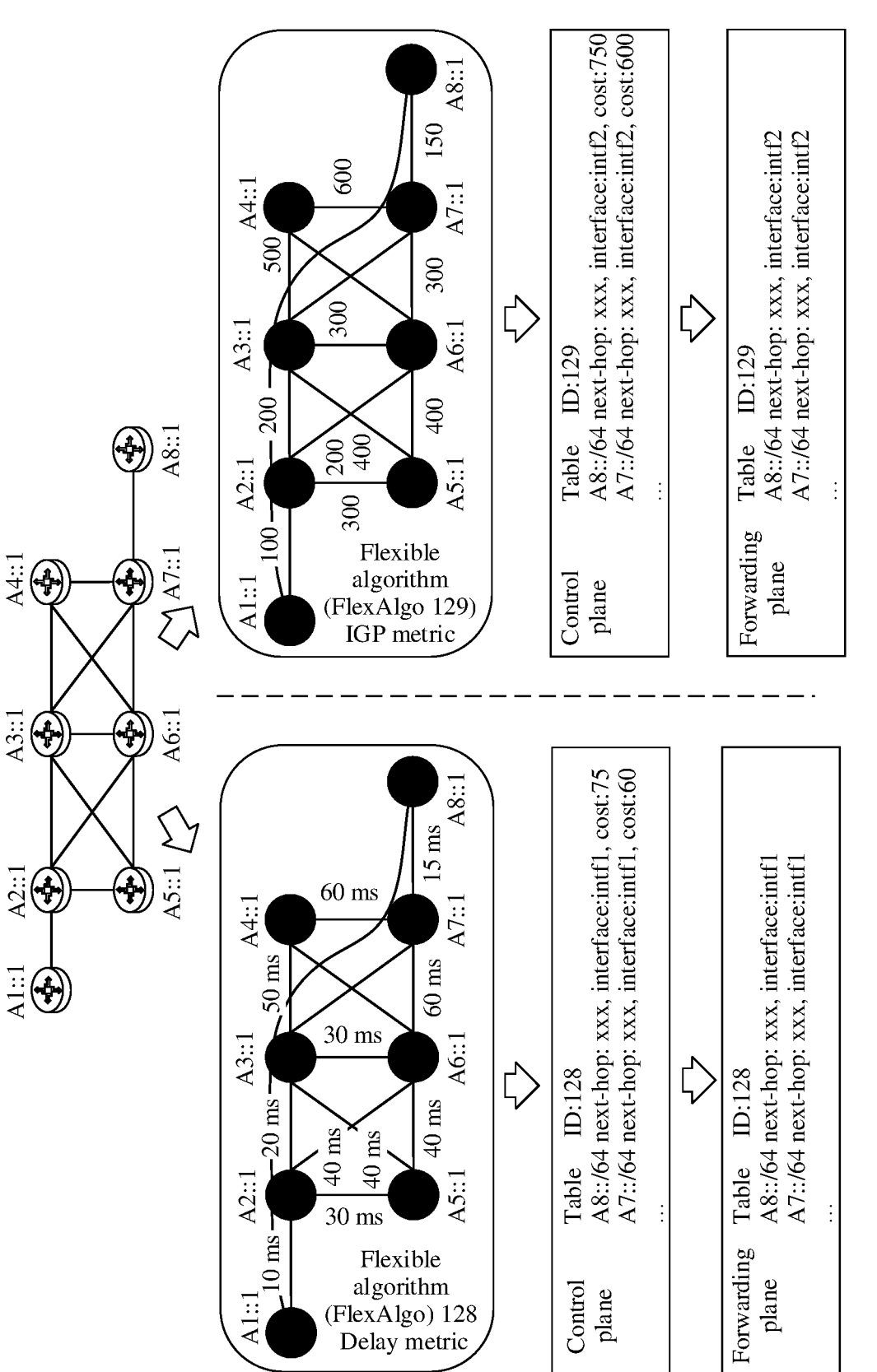
FIG. 6 is a schematic diagram of a process of generating routing information according to an embodiment of this application.

A process of generating routing information shown in FIG. 6 is used as an example. A network is divided into a topology corresponding to a FlexAlgo 128 that is based on a delay metric and a topology corresponding to a FlexAlgo 129 that is based on an interior gateway protocol (IGP)

metric. For a piece of routing information A8::/64 next-hop: xxx, interface:intf1, cost:75 in the topology corresponding to the FlexAlgo 128, a prefix is A8::/64, a next-hop address is xxx, an outbound interface is intf1, and a cost is 75. As shown in FIG. 6, the routing information A8::/64 next-hop: xxx, interface:intf1, cost:75 and routing information A7::/64 next-hop:xxx, interface:intf1, cost:60 that correspond to the topology corresponding to the FlexAlgo 128 are in a same forwarding table, and a table ID is 128.

In an example embodiment, alternatively, for the plurality of pieces of routing information of the same network topology, each piece of routing information may correspond to one network topology identifier, and a one-to-one relationship between the network topology identifier and the routing information is used to implement a case in which the routing information in the same network topology corresponds to a same network topology identifier.

Case 2: The first routing information includes an identifier of the first network topology.

In the case 2, the first routing information includes but is not limited to a prefix, a next hop, an outbound interface, and a cost. Different from the first routing information in the case 1, the first routing information in the case 2 includes a prefix obtained by encoding an original prefix and the identifier of the first network topology, that is, the identifier of the first network topology is in the first routing information, so that a network slice is associated with a target network topology. Because the identifier of the first network topology is included in the first routing information, routing information of network topologies can still be distinguished even if the routing information is in one forwarding table.

Figure 7:
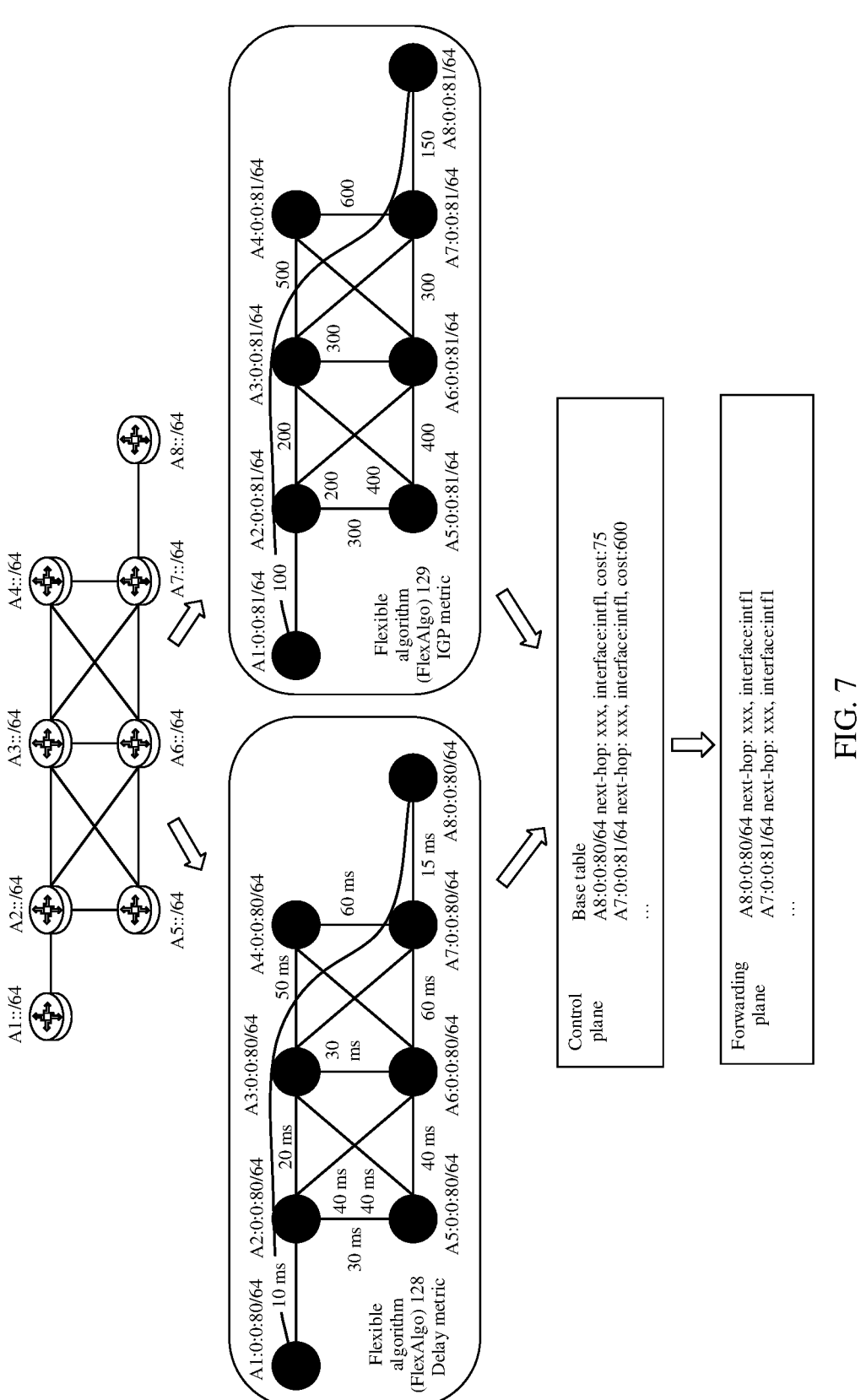
FIG. 7 is a schematic diagram of a process of generating routing information according to an embodiment of this application.

A process of generating routing information shown in FIG. 7 is used as an example. A network is divided into a topology corresponding to a FlexAlgo 128 that is based on a delay metric and a topology corresponding to a FlexAlgo 129 that is based on an IGP metric. For a piece of routing information A8:0:0:80/64 next-hop:xxx, interface:intf1, cost:75 in the topology corresponding to the FlexAlgo 128, a prefix is A8:0:0:80/64, where the prefix A8:0:0:80/64 is obtained by encoding an original prefix A8::/64 and an identifier of the network topology, a next-hop address is xxx, an outbound interface is intf1, and a cost is 75. Because an identifier of each network topology is included in corresponding routing information, the piece of routing information A8:0:0:80/64 next-hop:xxx, interface:intf1, cost:75 in the topology corresponding to the FlexAlgo 128 and a piece of routing information A8:0:0:81/64 next-hop:xxx, interface:intf1, cost:60 in the topology corresponding to the FlexAlgo 129 can still be distinguished based on a difference between A8:0:0:80 and A8:0:0:81 even if the two pieces of routing information are in one forwarding table.

In an example embodiment, the first routing information further includes an identifier of a first resource corresponding to the first network topology, and the identifier of the first resource corresponds to an interface of the first resource.

It should be noted that a manner of generating the second routing information is the same as a manner of generating the first routing information. For details, refer to the foregoing manner of generating the first routing information. For example, the second routing information corresponds to an identifier of the second network topology. Alternatively, the second routing information includes an identifier of the second network topology. In addition, in an example embodiment, the second routing information further includes an identifier of a second resource corresponding to the second network topology, and the identifier of the second resource corresponds to an interface of the second resource.

In conclusion, one locator and a plurality of corresponding associated flexible algorithms are included in location information and sent to the first network device, and the first network device generates routing information based on an associated flexible algorithm corresponding to a network topology in which the first network device is located. Compared with a case in which one locator carries one flexible algorithm, in this case, in a process of generating the routing information, IPv6 address space is reduced, and network resources are saved.

The routing information obtained by using the method for generating routing information according to this embodiment of this application may be applied to a process of forwarding a packet. With reference to FIG. 8, a method for forwarding a packet according to an embodiment of this application includes the following several processes.

801: A first network device obtains a first packet, where a network topology matching the first packet is a first network topology, and the first network topology is a network topology in which the first network device is located.

In an example embodiment, that a first network device obtains a first packet includes but is not limited to the following two cases.

Case 1: The first network device is a head node device sending a packet.

Because the first network device is the head node device sending a packet, an obtained packet does not include an identifier of the first network topology. To perform packet forwarding based on the network topology, that a first network device obtains a first packet includes: The first network device obtains a second packet, and adds the identifier of the first network topology to the second packet, to obtain the first packet.

For example, that the first network device adds the identifier of the first network topology to the second packet, to obtain the first packet includes but is not limited to the following two adding manners.

Adding manner 1: The identifier of the first network topology is added to a hop-by-hop (HBH) field of the second packet, to obtain the first packet.

For the adding manner 1, an HBH header, namely, the HBH field, is added to the second packet at a packet ingress of the first network device, a corresponding topo ID is added to the HBH field, and the identifier of the first network topology is added to the HBH field, so that a device receiving the second packet can determine the first network topology, and determine routing information of the first packet based on a relationship between the network topology and the routing information.

For example, the second packet includes an ethernet (ETH) layer, an internet protocol (IP) layer including a differentiated services code point (differentiated services code point, DSCP), a general packet radio service (GPRS) tunneling protocol (GTP) layer, and a payload layer. Optionally, the second packet may further include a virtual local area network (VLAN) layer.

A process of forwarding a packet shown in FIG. 9 is used as an example. In the method provided in this embodiment of this application, a locator can carry a plurality of flexible algorithms. To be specific, when a plurality of flexible algorithms share a locator, corresponding routing information can be searched for based on an identifier of the flexible algorithm, namely, a topology identifier. For example, a packet is forwarded through an SRv6 best effort (BE) tunnel shown in FIG. 9. For an SRv6 BE tunnel that does not support locator sharing, when forwarding a packet, a forwarding plane determines, based on an SID[B1::1] in the packet, that a next hop is (2001::2) and an outbound interface (outintf) is (Gi0/0/1).

For an SRv6 BE tunnel that supports locator sharing, when forwarding a packet, the forwarding plane determines, based on an SID[B1::1] in the packet and a network topology (for example, a topology corresponding to a FlexAlgo), that a next hop is (2001::2) and an outbound interface (outintf) is (Gi0/0/1). Therefore, after obtaining the second packet, the first network device adds, between the IP layer and the ETH layer of the second packet, an IPv6 header (Head) and the HBH field including the topology ID. The IPv6 header includes a version (version 11) field, a traffic class field, a flow label field, a payload length field, a source address field, a destination address field, and the like. In FIG. 9, a source address is A1:1, and a destination address is A2::11. To implement SRv6 forwarding in an IPv6 packet, an SRv6 extension header (routing type=4) SRH is introduced. In an SRv6 packet encapsulation format shown in FIG. 9, meanings of fields of the SRH are as follows:

| Field name | Length | Meaning |
|---|---|---|
| Next header | 8 bits | Identifies a type of a packet header immediately following the SRH |
| Hdr Ext Len | 8 bits | Indicates a length of the SRH header, and mainly refers to a length occupied from a segment list [o] to a segment list [n] |
| Routing type | 8 bits | Identifies a type of a route header, where an SRH type is 4 |
| Segments left | 8 bits | Indicates a quantity of transit nodes that should still be accessed before a destination node is reached |
| Last entry | 8 bits | Indicates an index including a last element of a segment list in the segment list |
| Flags | 8 bits | Indicates some identifiers of a data packet |
| Tag | 16 bits | Identifies data packets in a same group |
| Segment list [n] | 128*n bits | Indicates a segment list, where the segment list is encoded from a last segment of a path, and the segment list is in a form of an IPv6 address |
| Optional TLV | Variable | Indicates a TLV part whose length is variable |

It should be noted that the foregoing manner of adding the identifier of the first network topology (topo-ID) to the HBH is merely used as an example for description, but is not used to limit a manner of adding the identifier of the first network topology to the second packet. Another adding manner may alternatively be used. For example, the identifier of the first network topology is added to the flow label (flowlabel), a domain name system (DNS) over a hypertext transfer protocol secure (hypertext transfer protocol over secure socket layer, HTTPS) (DNS-over-HTTPS, DoH), or an SRH.

Adding manner 2: A segment identifier including the identifier of the first network topology is added to a segment identifier SID list of the second packet, to obtain the first packet.

For the adding manner 2, an HBH header, namely, an HBH field, is not encapsulated at a packet ingress of the first network device, but four bytes are extended after a VPN SID in the second packet as extension bits, and a topoID is filled in the extension bits.

For example, in addition to adding the identifier of the first network topology to the second packet, an identifier of a first resource corresponding to the first network topology is further added to the second packet. In other words, the identifier of the first network topology and the identifier of the first resource are added to the second packet, to obtain the first packet. The first resource is a resource in the first network topology, and the identifier of the first resource is used to indicate to send the first packet in the first network topology by using the first resource.

Figure 10:
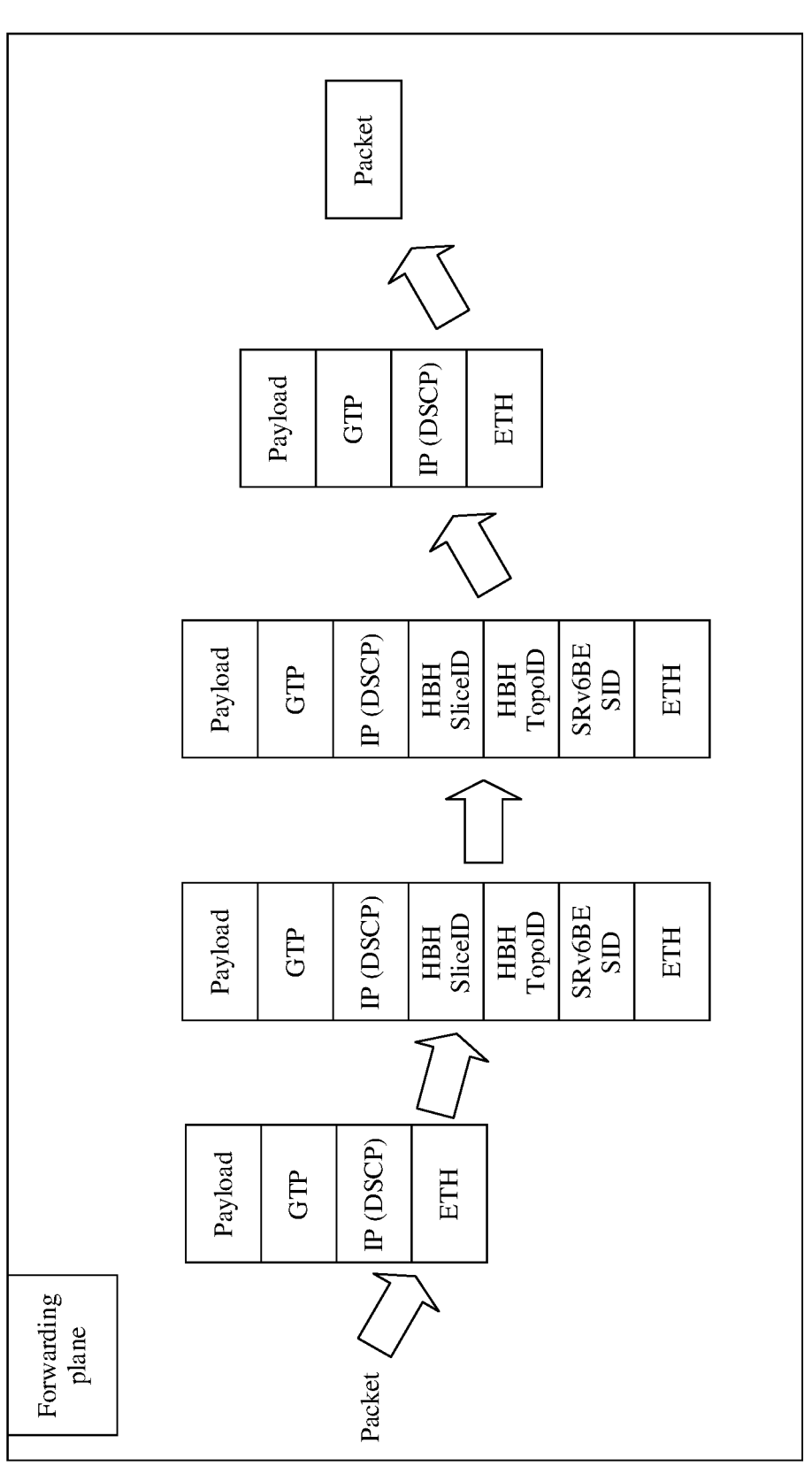
FIG. 10 is a schematic diagram of a process of obtaining a first packet according to an embodiment of this application.

A process of obtaining the first packet shown in FIG. 10 is used as an example. The second packet includes an ethernet (ETH) layer, an internet protocol (IP) layer including a differentiated services code point (DSCP), a general packet radio service (GPRS) tunneling protocol (GTP) layer, and a payload layer. After receiving the second packet, the first network device adds, between the IP layer and the ETH layer of the second packet, an SID of an SRv6 BE and an HBH field including the topology ID. In addition, an identifier of a resource is further added. For example, the identifier of the resource, such as a slice ID in FIG. 10, is also added to the HBH field.

In an example embodiment, according to the method provided in this embodiment of this application, before the identifier of the first network topology is added to the second packet, that a network topology matching the second packet is the first network topology needs to be further determined. Therefore, that the first network device adds the identifier of the first network topology to the second packet, to obtain the first packet includes: The first network device determines, based on a destination address of the second packet, that a flexible algorithm matching the second packet is a first flexible algorithm. The first flexible algorithm corresponds to the first network topology. The first network device determines that the network topology matching the second packet is the first network topology. Alternatively, the first network device determines that a destination address of the second packet matches a specified destination address. The specified destination address matches the first network topology. The first network device determines that the network topology matching the second packet is the first network topology.

For example, a prefix and a mask that correspond to the first flexible algorithm may be specified in advance, so that after a prefix and a mask that correspond to the second packet are obtained based on the destination address of the second packet, it is determined whether the prefix and the mask that correspond to the second packet are the specified prefix and mask. If the prefix and the mask that correspond to the second packet are the specified prefix and mask, it is determined that the flexible algorithm matching the second packet is the first flexible algorithm. In addition, because the first flexible algorithm corresponds to the first network topology, it is determined that the network topology matching the second packet is the first network topology. For example, the specified prefix and mask correspond to the identifier of the first network topology, the prefix that corresponds to the second packet and that is obtained based on the destination address of the second packet is the specified prefix, and the mask obtained based on the destination address of the second packet is the specified mask. In this way, the first network topology corresponding to the identifier of the first network topology is the network topology matching the second packet.

Case 2: The first network device is a transit node device sending a packet.

Because the first network device is the transit node device sending a packet, that a first network device obtains a first packet includes: The first network device receives the first packet, and determines that the network topology matching the first packet is the first network topology. The first network topology matching the first packet is determined, so that routing information of the first packet is determined based on a relationship between the network topology and the routing information.

A manner of determining the first network topology matching the first packet is not limited in this embodiment of this application, for example, is implemented in a manner such as policy fuzzy matching or explicit specification. The policy fuzzy matching refers to matching a topoID based on a specified prefix and mask. The explicit specification refers to specifying a target manner of matching a topoID. In an example embodiment, that the first network device determines that the network topology matching the first packet is the first network topology includes but is not limited to the following three determining manners.

Determining manner 1: The first network device determines, based on a destination address of the first packet, that a flexible algorithm matching the first packet is a first flexible algorithm. The first flexible algorithm corresponds to the first network topology. The first network device determines, based on the first flexible algorithm, that the network topology matching the first packet is the first network topology.

For the determining manner 1, a prefix and a mask that correspond to the first flexible algorithm may be specified in advance, so that after a prefix and a mask that correspond to the first packet are obtained based on the destination address of the first packet, it is determined whether the prefix and the mask that correspond to the first packet are the specified prefix and mask. If the prefix and the mask that correspond to the first packet are the specified prefix and mask, it is determined that the flexible algorithm matching the first packet is the first flexible algorithm. In addition, because the first flexible algorithm corresponds to the first network topology, it is determined that the network topology matching the first packet is the first network topology. For example, the specified prefix and mask correspond to an identifier of the first network topology, the prefix that corresponds to the first packet and that is obtained based on the destination address of the first packet is the specified prefix, and the mask obtained based on the destination address of the first packet is the specified mask. In this way, the first network topology corresponding to the identifier of the first network topology is the network topology matching the first packet.

Determining manner 2: The first network device determines that a destination address of the first packet matches a specified destination address. The specified destination address matches the first network topology. The first network device determines that the network topology matching the first packet is the first network topology.

For the determining manner 2, a network topology matching the specified destination address may be specified in advance. Therefore, a network topology matching the destination address of the first packet is determined, and the network topology matching the first packet is determined as the first network topology.

Determining manner 3: The first packet includes an identifier of the first network topology. The network topology matching the first packet is determined as the first network topology based on the identifier of the first network topology included in the first packet.

For the determining manner 3, because the first packet includes the identifier of the first network topology, the network topology matching the first packet may be directly determined as the first network topology based on the identifier of the first network topology. The identifier of the first network topology included in the first packet may be added by a head node device.

802: The first network device determines, based on the first network topology, that the routing information of the first packet is first routing information, where the first routing information is used to send the packet in the first network topology.

The first routing information is computed based on the first flexible algorithm, the first flexible algorithm is one of a plurality of associated flexible algorithms, the plurality of associated flexible algorithms are obtained based on location information sent by a second network device, and the location information includes a location identifier and the plurality of associated flexible algorithms corresponding to the location identifier. For example, before the determining, based on the identifier of the first network topology, that the routing information of the first packet is first routing information, the method further includes: The first network device receives the location information sent by the second network device. The first network device generates, based on the first flexible algorithm, the first routing information to the second network device.

For processes of receiving the location information and computing the first routing information, refer to the method for sending location information and the process of generating the first routing information shown in FIG. 4. Details are not described herein again.

After it is determined that the network topology matching the first packet is the first network topology, because the first network topology has an association relationship with the first routing information, it may be determined, based on the first network topology, that the routing information of the first packet is the first routing information.

803: The first network device sends the first packet based on the first routing information.

In the manner of generating the first routing information shown in FIG. 4, the first routing information includes but is not limited to the following two cases. For different cases of generating the first routing information, that the first network device sends the first packet based on the first routing information also includes two cases.

Case 1: The first routing information corresponds to the identifier of the first network topology.

For example, that the first network device sends the first packet based on the first routing information includes: The first network device determines the first routing information based on the identifier of the first network topology, and forwards the first packet based on an outbound interface in the first routing information.

A process of generating routing information shown in FIG. 6 is still used as an example. If the first network topology is a topology corresponding to a FlexAlgo 128, the first routing information is one piece of routing information A8::/64 next-hop:xxx, interface:intf1, cost:75 in the topology corresponding to the FlexAlgo 128. In the first routing information, a prefix is A8::/64, a next-hop address is xxx, an outbound interface is intf1, and a cost is 75. As shown in FIG. 6, the routing information A8::/64 next-hop:xxx, interface:intf1, cost:75 and routing information A7::/64 next-hop:xxx, interface:intf1, cost:60 that correspond to the topology corresponding to the FlexAlgo 128 are in a same forwarding table, and a table ID is 128. It can be learned that the routing information A8::/64 next-hop:xxx, interface:intf1, cost:75 corresponding to the topology corresponding to the FlexAlgo 128 is independent of and corresponds to a topology ID.

After receiving the first packet and determining that the network topology matching the first packet is the first network topology, namely, the topology corresponding to the FlexAlgo 128, the first network device finds a forwarding table whose table ID is 128, and forwards the first packet based on the outbound interface in the first routing information A8::/64 next-hop:xxx, interface:intf1, cost:75. For example, the first network device determines that an outbound interface of the first packet is intf1, and forwards the first packet through the intf1 interface.

Case 2: The first routing information includes the identifier of the first network topology.

For example, that the first network device sends the first packet based on the first routing information includes: The first network device encodes the identifier of the first network topology and a prefix of the destination address of the first packet, determines the first routing information based on a prefix obtained after encoding, and forwards the first packet based on an outbound interface in the first routing information.

A process of generating routing information shown in FIG. 7 is still used as an example. If the first network topology is a topology corresponding to a FlexAlgo 128, the first routing information is one piece of routing information A8:0:0:80/64 next-hop:xxx, interface:intf1, cost:75 in the topology corresponding to the FlexAlgo 128. The first routing information includes a prefix A8:0:0:80/64, a next-hop address xxx, an outbound interface intf1, and a cost 75. The prefix A8:0:0:80/64 is obtained by encoding an original prefix A8::/64 and the identifier, namely, 128, of the first network topology. It can be learned that the identifier of the first network topology is included in the first routing information. Specifically, the identifier of the first network topology is included in the prefix of the first routing information.

After receiving the first packet and determining that the network topology matching the first packet is the first network topology, namely, the topology corresponding to the FlexAlgo 128, the first network device may encode the identifier, namely, 128, of the first network topology and the prefix of the destination address of the first packet, to obtain A8:0:0:80, so as to determine that the first routing information is A8:0:0:80/64 next-hop:xxx, interface:intf1, cost:75 and forward the first packet through the outbound interface in A8:0:0:80/64 next-hop:xxx, interface:intf1, cost:75. For example, the first network device determines that an outbound interface of the first packet is intf1, and forwards the first packet through the intf1 interface.

In an example embodiment, the first routing information further includes an identifier of a first resource, and the first resource is a resource in the first network topology. In this case, that the first network device sends the first packet based on the first routing information includes: sending the first packet in the first network topology based on the first routing information and by using the first resource.

For example, the identifier of the first resource corresponds to an interface of the first resource. Therefore, the first network device forwards the first packet based on the interface of the first resource, that is, sends the first packet by using the first resource.

It should be noted that, in the method shown in FIG. 8, that the network topology in which the first network device is located is the first network topology, and a process in which the first network device forwards the first packet based on the first routing information generated based on the first network topology are only used. A case in which the network topology in which the first network device is located further includes a network topology other than the first network topology is also applicable to the method for forwarding a packet according to this embodiment of this application. For details, refer to the method procedure shown in FIG. 8. Details are not described herein again.

For example, the method provided in this embodiment of this application further includes: The first network device obtains a third packet. A network topology matching the third packet is a second network topology, and the second network topology is a network topology in which the first network device is located. The first network device determines, based on the second network topology, that routing information of the third packet is second routing information. The first network device sends the third packet based on the second routing information. For example, the second routing information corresponds to an identifier of the second network topology. Alternatively, the second routing information includes an identifier of the second network topology. For a process of forwarding the third packet, refer to the process of forwarding the first packet. Details are not described herein again.

In the method provided in this embodiment of this application, after the first packet is obtained, the first routing information used to forward the first packet is determined based on the first network topology matching the first packet, so that the first packet is sent in the first network topology. This implements a manner of forwarding a packet based on a network topology.

Figure 11:
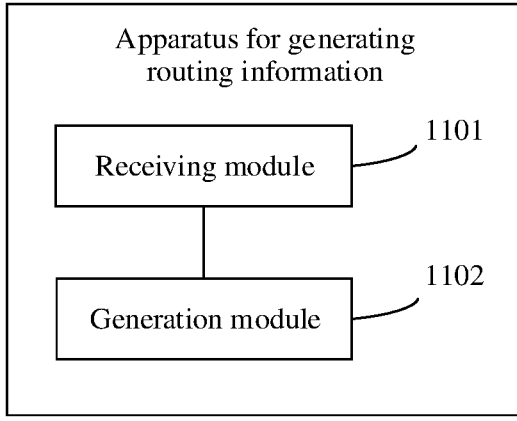
FIG. 11 is a schematic diagram of a structure of an apparatus for generating routing information according to an embodiment of this application.

An embodiment of this application provides an apparatus for generating routing information. The apparatus is configured to perform, through modules shown in FIG. 11, the method for generating routing information in FIG. 4. The apparatus may be the first network device in FIG. 4. With reference to FIG. 11, the apparatus includes: a receiving module 1101, configured to receive location information sent by a second network device, where the location information includes a location identifier and a plurality of associated flexible algorithms corresponding to the location identifier, the location identifier is used to identify a location of the second network device in a network, and for a function performed by the receiving module 1101, reference may be made to related descriptions of 402 shown in FIG. 4, and details are not described herein again; and a generation module 1102, configured to generate, based on a first flexible algorithm, first routing information to the second network device, where the first flexible algorithm is one of the plurality of associated flexible algorithms, the first flexible algorithm corresponds to a first network topology, the first network topology is a network topology in which the apparatus for generating routing information is located, the first routing information is used to send a packet to the second network device in the first network topology, and for a function performed by the generation module 1102, reference may be made to related descriptions of 403 shown in FIG. 4, and details are not described herein again.

In a possible implementation, the plurality of associated flexible algorithms further include a second flexible algorithm. The generation module 1102 is further configured to generate, based on the second flexible algorithm, second routing information to the second network device. The second routing information corresponds to a second network topology. The second network topology is a network topology in which the apparatus for generating routing information is located. The second routing information is used to send a packet to the second network device in the second network topology.

In a possible implementation, the first routing information corresponds to an identifier of the first network topology.

In a possible implementation, the first routing information includes an identifier of the first network topology.

Figure 12:
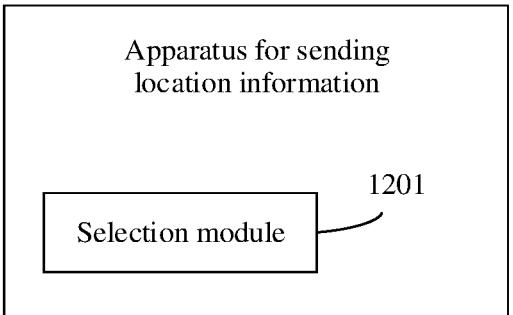
FIG. 12 is a schematic diagram of a structure of an apparatus for sending location information according to an embodiment of this application.

An embodiment of this application provides an apparatus for sending location information. The apparatus is configured to perform, through modules shown in FIG. 12, the method for sending location information in FIG. 4. The apparatus may be the second network device in FIG. 4. With reference to FIG. 12, the apparatus includes: a sending module 1201, configured to send location information to a first network device, where the location information includes a location identifier and a plurality of associated flexible algorithms corresponding to the location identifier, the location identifier is used to identify a location, in a network, of the apparatus for sending location information, a first flexible algorithm in the plurality of associated flexible algorithms is used by the first network device to generate first routing information to a second network device, the first flexible algorithm corresponds to a first network topology, the first network topology is a network topology in which the first network device is located, and the first routing information is used by the first network device to send, in the first network topology, a packet to the apparatus for sending location information. For a function performed by the sending module 1201, refer to related descriptions of 401 shown in FIG. 4, and details are not described herein again.

In a possible implementation, the plurality of associated flexible algorithms further include a second flexible algorithm. The second flexible algorithm is used by the first network device to generate second routing information to the apparatus for sending location information. The second routing information corresponds to a second network topology. The second network topology is a network topology in which the first network device is located. The second routing information is used to send, in the second network topology, a packet to the apparatus for sending location information.

Figure 13:
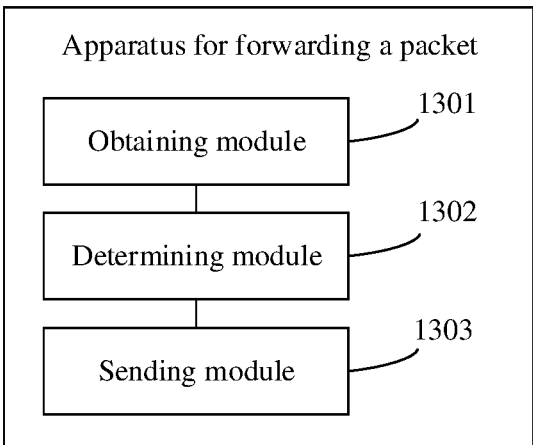
FIG. 13 is a schematic diagram of a structure of an apparatus for forwarding a packet according to an embodiment of this application.

An embodiment of this application provides an apparatus for forwarding a packet. The apparatus is configured to perform, through modules shown in FIG. 13, the method for forwarding a packet in FIG. 8. The apparatus is the first network device in FIG. 8. With reference to FIG. 13, the apparatus includes: an obtaining module 1301, configured to obtain a first packet, where a network topology matching the first packet is a first network topology, the first network topology is a network topology in which the apparatus for forwarding a packet is located, and for a function performed by the obtaining module 1301, reference may be made to related descriptions of 801 shown in FIG. 8, and details are not described herein again; a determining module 1302, configured to determine first routing information based on the first network topology, where the first routing information is used to send the first packet in the first network topology, and for a function performed by the determining module 1302, reference may be made to related descriptions of 802 shown in FIG. 8, and details are not described herein again; and a sending module 1303, configured to send the first packet based on the first routing information, where for a function performed by the sending module 1303, reference may be made to related descriptions of 803 shown in FIG. 8, and details are not described herein again.

In a first possible implementation, the obtaining module 1301 is configured to: obtain a second packet; and add an identifier of the first network topology to the second packet, to obtain the first packet.

In a second possible implementation, the obtaining module 1301 is configured to add the identifier of the first network topology to a hop-by-hop HBH field of the second packet, to obtain the first packet.

In a third possible implementation, the obtaining module 1301 is configured to add a segment identifier including the identifier of the first network topology to a segment identifier list of the second packet, to obtain the first packet.

In a fourth possible implementation, the obtaining module 1301 is configured to add the identifier of the first network topology and an identifier of a first resource to the second packet, to obtain the first packet. The first resource is a resource in the first network topology, and the identifier of the first resource is used to indicate to send the first packet in the first network topology by using the first resource.

In a fifth possible implementation, the obtaining module 1301 is configured to: determine, based on a destination address of the second packet, that a flexible algorithm matching the second packet is a first flexible algorithm, where the first flexible algorithm corresponds to the first network topology, and determine that a network topology matching the second packet is the first network topology; or determine that a destination address of the second packet matches a specified destination address, where the specified destination address matches the first network topology, and determine that a network topology matching the second packet is the first network topology.

In a sixth possible implementation, the obtaining module 1301 is configured to: receive the first packet; and determine that the network topology matching the first packet is the first network topology.

In a seventh possible implementation, the determining module 1302 is configured to: determine, based on a destination address of the first packet, that a flexible algorithm matching the first packet is a first flexible algorithm, where the first flexible algorithm corresponds to the first network topology, and determine that the network topology matching the first packet is the first network topology; or determine that a destination address of the first packet matches a specified destination address, where the specified destination address matches the first network topology, and determine that the network topology matching the first packet is the first network topology.

In an eighth possible implementation, the first packet includes an identifier of the first network topology. The determining module 1302 is configured to determine, based on the identifier of the first network topology included in the first packet, that the network topology matching the first packet is the first network topology.

In a ninth possible implementation, the first packet further includes an identifier of a first resource, and the first resource is a resource in the first network topology.

The sending module 1303 is configured to send the first packet in the first network topology based on the first routing information and by using the first resource.

In a tenth possible implementation, the first routing information corresponds to the identifier of the first network topology.

The determining module 1302 is configured to determine the first routing information based on a correspondence between the first routing information and the identifier of the first network topology.

In an eleventh possible implementation, the identifier of the first network topology is included in the first routing information.

The determining module 1302 is configured to determine the first routing information based on the identifier of the first network topology included in the first routing information.

It should be understood that, when the apparatuses provided in FIG. 11 to FIG. 13 implement functions of the apparatuses, division into the functional modules is merely used as an example for description. During actual application, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to a same concept. For a specific implementation process of the apparatuses, refer to the method embodiments. Details are not described herein again.

Figure 14:
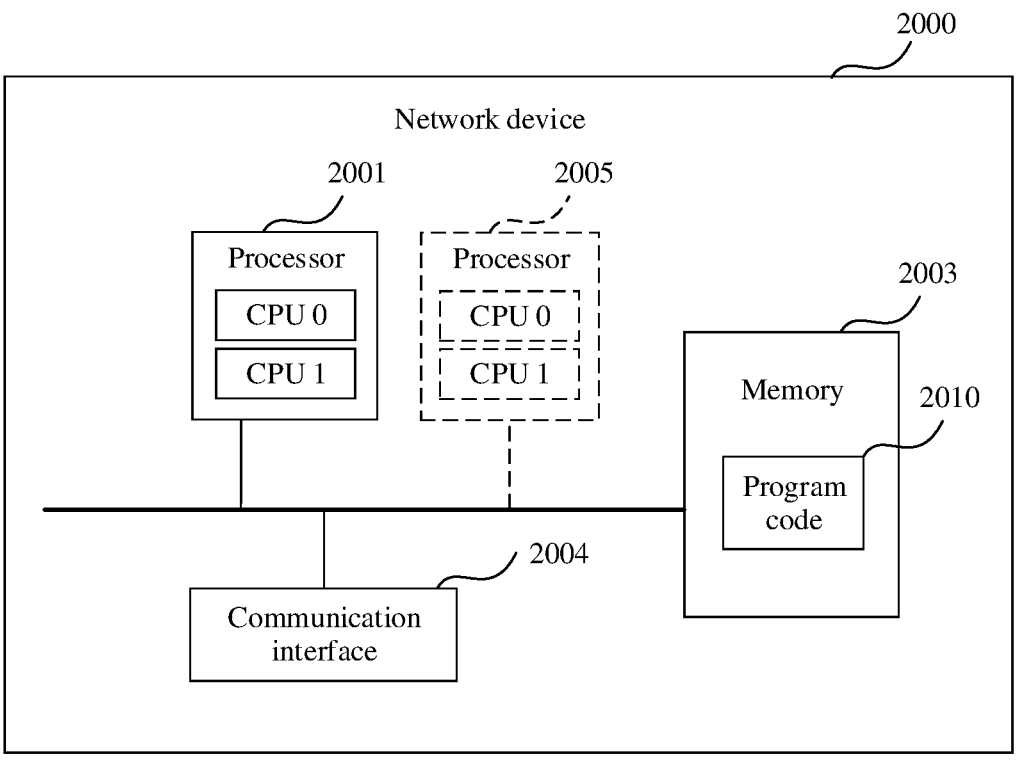
FIG. 14 is a schematic diagram of a structure of a network device according to an embodiment of this application.

FIG. 14 is a schematic diagram of a structure of a network device 2000 according to an example embodiment of this application. The network device 2000 shown in FIG. 14 is configured to perform operations related to the method for sending location information and the method for generating routing information shown in FIG. 4 and the method for forwarding a packet shown in FIG. 8. The network device 2000 is, for example, a switch or a router, and the network device 2000 may be implemented by using a general bus architecture.

As shown in FIG. 14, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field programmable gate array (FPGA), generic array logic (GAL), or any combination thereof. The processor 2001 may implement or execute various logical blocks, modules, and circuits described with reference to content disclosed in embodiments of the present invention. Alternatively, the processor may be a combination of processors implementing a computing function, for example, a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI for short) bus, an extended industry standard architecture (EISA for short) bus, or the like. Buses may be classified into an address bus, a data bus, a control bus, and the like. For ease of representation, only one bold line is used to represent the bus in FIG. 14, but this does not mean that there is only one bus or only one type of bus.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 may be integrated with the processor 2001.

The communication interface 2004 is configured to communicate with another device or a communication network by using any transceiver-type apparatus. The communication network may be the ethernet, a radio access network (RAN), a wireless local area network (WLAN), or the like. The communication interface 2004 may include a wired communication interface, and may further include a wireless communication interface. Specifically, the communication interface 2004 may be an ethernet interface, a fast ethernet (FE) interface, a gigabit ethernet (GE) interface, an asynchronous transfer mode (ATM) interface, a wireless local area network (WLAN) interface, a cellular network communication interface, or a combination thereof. The ethernet interface may be an optical interface, an electrical interface, or a combination thereof. In this embodiment of this application, the communication interface 2004 may be used by the network device 2000 to communicate with another device.

During specific implementation, in an embodiment, the processor 2001 may include one or more CPUs, for example, a CPU 0 and a CPU 1 shown in FIG. 14. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the network device 2000 may include a plurality of processors, for example, the processor 2001 and a processor 2005 shown in FIG. 14. Each of the processors may be a single-core processor (single-CPU) or a multi-core processor (multi-CPU). The processor herein may be one or more devices, circuits, and/or processing cores configured to process data (for example, computer program instructions).

During specific implementation, in an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for performing the solutions of this application, and the processor 2001 may execute the program code 2010 stored in the memory 2003. To be specific, the network device 2000 may implement, by using the processor 2001 and the program code 2010 in the memory 2003, the method for sending location information, the method for generating routing information, and the method for forwarding a packet that are provided in the method embodiments. The program code 2010 may include one or more software modules. Optionally, the processor 2001 may also store program code or instructions for performing the solutions of this application.

In a specific embodiment, the network device 2000 in this embodiment of this application may correspond to the first network device in the foregoing method embodiments, and the processor 2001 in the network device 2000 reads instructions in the memory 2003, so that the network device 2000 shown in FIG. 14 can perform all or some operations performed by the first network device.

Specifically, the processor 2001 is configured to receive, through the communication interface, location information sent by a second network device. The location information includes a location identifier and a plurality of associated flexible algorithms corresponding to the location identifier, and the location identifier is used to identify a location of the second network device in a network. The processor 2001 generates, based on a first flexible algorithm, first routing information to the second network device. The first flexible algorithm is one of the plurality of associated flexible algorithms, the first flexible algorithm corresponds to a first network topology, the first network topology is a network topology in which the first network device is located, and the first routing information is used to send a packet to the second network device in the first network topology.

For another example, the processor 2001 obtains a first packet. A network topology matching the first packet is the first network topology, and the first network topology is a network topology in which the first network device is located. The first network device determines first routing information based on the first network topology. The first routing information is used to send the first packet in the first network topology. The processor 2001 sends the first packet based on the first routing information through the interface.

For brevity, other optional implementations are not described herein again.

For another example, the network device 2000 in this embodiment of this application may correspond to the second network device in the foregoing method embodiments, and the processor 2001 in the network device 2000 reads instructions in the memory 2003, so that the network device 2000 shown in FIG. 14 can perform all or some operations performed by the second network device.

Specifically, the processor 2001 is configured to send location information to a first network device through the communication interface. The location information includes a location identifier and a plurality of associated flexible algorithms corresponding to the location identifier, the location identifier is used to identify a location of the second network device in a network, a first flexible algorithm in the plurality of associated flexible algorithms is used by the first network device to generate first routing information to the second network device, the first flexible algorithm corresponds to a first network topology, the first network topology is a network topology in which the first network device is located, and the first routing information is used by the first network device to send a packet to the second network device in the first network topology.

For brevity, other optional implementations are not described herein again.

The network device 2000 may further correspond to the apparatuses shown in FIG. 11 to FIG. 13. Each functional module in the apparatuses shown in FIG. 11 to FIG. 13 is implemented by using software of the network device 2000. In other words, the functional modules included in the apparatuses shown in FIG. 11 to FIG. 13 are generated after the processor 2001 of the network device 2000 reads the program code 2010 stored in the memory 2003.

The steps of the method for sending location information and the method for generating routing information shown in FIG. 4 and the method for forwarding a packet shown in FIG. 8 are implemented by using an integrated logic circuit of hardware in the processor of the network device 2000 or instructions in a form of software. The steps of the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

Figure 15:
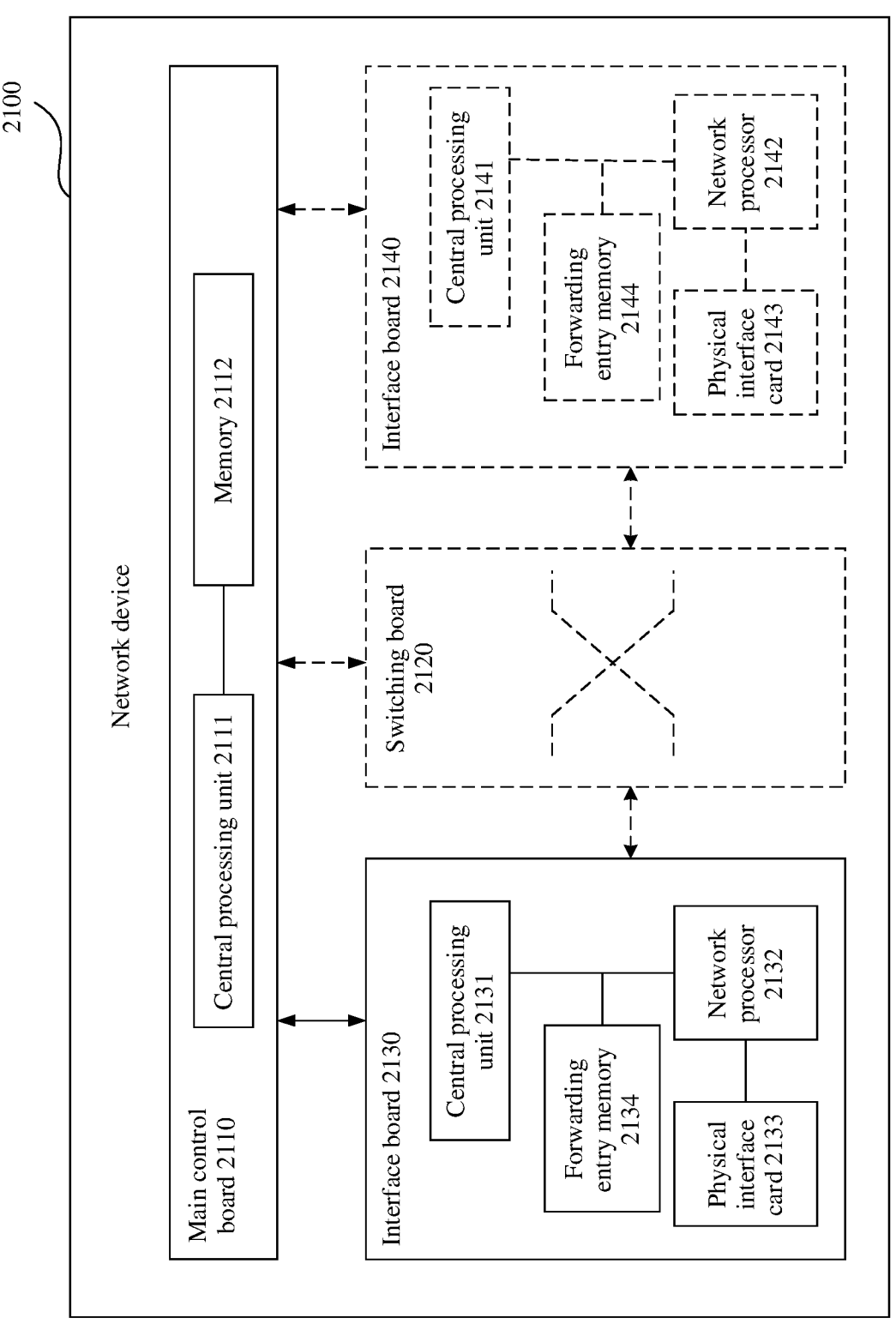
FIG. 15 is a schematic diagram of a structure of a network device according to an embodiment of this application.

FIG. 15 is a schematic diagram of a structure of a network device 2100 according to another example embodiment of this application. The network device 2100 shown in FIG. 15 is configured to perform all or some operations related to the method for sending location information and the method for generating routing information shown in FIG. 4 and the method for forwarding a packet shown in FIG. 8. The network device 2100 is, for example, a switch or a router, and the network device 2100 may be implemented by using a general bus architecture.

As shown in FIG. 15, the network device 2100 includes: a main control board 2110 and an interface board 2130.

The main control board is also referred to as a main processing unit (MPU) or a route processor card. The main control board 2110 is configured to control and manage components in the network device 2100, including route computation, device management, device maintenance, and a protocol processing function. The main control board 2110 includes: a central processing unit 2111 and a memory 2112.

The interface board 2130 is also referred to as a line processing unit (LPU), a line card, or a service board. The interface board 2130 is configured to provide various service interfaces, and forward a data packet. The service interface includes but is not limited to an ethernet interface, a POS (Packet over SONET/SDH) interface, and the like. The ethernet interface is, for example, a flexible ethernet service interface (FlexE Clients). The interface board 2130 includes: a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2132 is configured to forward a received packet based on a forwarding table stored in the forwarding entry memory 2134. If a destination address of the packet is an address of the network device 2100, the network processor 2132 sends the packet to a CPU (for example, the central processing unit 2131) for processing. If a destination address of the packet is not an address of the network device 2100, the network processor 2132 finds, based on the destination address, a next hop and an outbound interface that correspond to the destination address in the forwarding table, and forwards the packet to the outbound interface corresponding to the destination address. Processing on an uplink packet may include: processing at a packet ingress interface and forwarding table lookup, and processing on a downlink packet may include: forwarding table lookup and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

Optionally, the network device 2100 includes a plurality of interface boards. For example, the network device 2100 further includes an interface board 2140, and the interface board 2140 includes: a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the network device 2100 further includes a switching board 2120. The switching board 2120 may also be referred to as a switch fabric unit (SFU). When the network device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard by using a system bus for interworking. In a possible implementation, inter-process communication (IPC) channels are established between the main control board 2110 and the interface board 2130 and between the main control board 2110 and the interface board 2140, and communication between the main control board 2110 and the interface board 2130 and between the main control board 2110 and the interface board 2140 is performed through the IPC channels.

Logically, the network device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs the following functions: a function of a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a network device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of network device (for example, a network device such as a low-end switch or a router) has a weak data exchange and processing capability. A specific architecture that is to be used depends on a specific networking deployment scenario. This is not limited herein.

In a specific embodiment, the network device 2100 corresponds to the apparatus for generating routing information and the apparatus for forwarding a packet that are applied to the first network device and that are shown in FIG. 11 and FIG. 13. In some embodiments, the receiving module 1101 in the apparatus for generating routing information shown in FIG. 11 and the sending module 1303 shown in FIG. 13 are equivalent to the physical interface card 2133 in the network device 2100. The generation module 1102 in the apparatus for generating routing information shown in FIG. 11 and the obtaining module 1301 and the determining module 1302 shown in FIG. 13 are equivalent to the central processing unit 2111 or the network processor 2132 in the network device 2100.

In some embodiments, the network device 2100 further corresponds to the apparatus for sending location information that is applied to the second network device and that is shown in FIG. 12. In some embodiments, the sending module 1201 in the apparatus for sending location information shown in FIG. 12 is equivalent to the physical interface card 2133 in the network device 2100.

Based on the network devices shown in FIG. 14 and FIG. 15, an embodiment of this application further provides a communication system. The communication system includes a first network device and a second network device. Optionally, the first network device is the network device 2000 shown in FIG. 14 or the network device 2100 shown in FIG. 15, and the second network device is the network device 2000 shown in FIG. 14 or the network device 2100 shown in FIG. 15.

For methods performed by the first network device and the second network device, refer to related descriptions in the embodiments shown in FIG. 4 and FIG. 8. Details are not described herein again.

An embodiment of this application further provides a communication apparatus. The apparatus includes: a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the method that needs to be performed by the first network device.

An embodiment of this application further provides a communication apparatus. The apparatus includes: a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the method that needs to be performed by the second network device.

It should be understood that the processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machines (advanced RISC machines, ARM) architecture.

Further, in an optional embodiment, the memory may include a read-only memory and a random access memory, and provide instructions and data for the processor. The memory may further include a non-volatile random access memory. For example, the memory may further store information of a device type.

The memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example, and not limitation, many forms of RAMs may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

An embodiment of this application further provides a computer-readable storage medium. The storage medium stores at least one instruction, and the instruction is loaded and executed by a processor to implement the method for sending location information and the method for generating routing information shown in FIG. 4 and the method for forwarding a packet shown in FIG. 8.

An embodiment of this application further provides a computer program (product). When the computer program is executed by a computer, a processor or the computer may be enabled to perform corresponding steps and/or procedures in the foregoing method embodiments.

An embodiment of this application further provides a chip, including a processor, configured to invoke, from a memory, instructions stored in the memory and run the instructions, to enable a communication device on which the chip is installed to perform the methods in the foregoing aspects.

An embodiment of this application further provides another chip, including an input interface, an output interface, a processor, and a memory. The input interface, the output interface, the processor, and the memory are connected by using an internal connection path. The processor is configured to execute code in the memory. When the code is executed, the processor is configured to perform the methods in the foregoing aspects.

A part or all of the foregoing embodiments may be implemented through software, hardware, firmware, or any combination thereof. When software is used to implement the embodiments, a part or all of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

A person of ordinary skill in the art may be aware that, with reference to the method steps and the modules described in embodiments disclosed in this specification, implementation can be performed by using software, hardware, firmware, or a combination thereof. To clearly describe the interchangeability between the hardware and the software, the foregoing has generally described steps and composition of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

When software is used to implement the embodiments, a part or all of the embodiments may be implemented in a form of a computer program product. The computer program product includes one or more computer program instructions. For example, the method in embodiments of this application may be described in a context of machine-executable instructions. The machine-executable instructions are, for example, a program module executed in a device included in a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program module. The machine-executable instructions used for the program module may be executed locally or within a distributed device. In the distributed device, the program module may be located in both a local storage medium and a remote storage medium.

Computer program code used to implement the methods in embodiments of this application may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this application, the computer program code or related data may be carried by any appropriate carrier, so that a device, an apparatus, or a processor can perform various processing and operations described above. Examples of the carrier include a signal, a computer-readable medium, and the like.

Examples of the signal may include propagating signals in electrical, optical, radio, sound, or other forms, such as a carrier and an infrared signal.

The computer-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiments. Details are not described herein.

In the several embodiments provided in this application, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for indicating a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or a compact disc.

In this application, terms "first", "second", and the like are used to distinguish between same or similar items whose effects and functions are basically the same. It should be understood that there is no logical or time-sequence dependency between "first", "second", and "n$^{th}$", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their combinations not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (the stated condition or event) is detected" or "in response to detecting (the stated condition or event)".

It should be understood that determining B based on A does not mean that B is determined based on only A, and B may alternatively be determined based on A and/or other information.

It should be further understood that "one embodiment", "an embodiment", or "a possible implementation" mentioned throughout this specification means that particular features, structures, or characteristics related to the embodiment or implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

The foregoing descriptions are merely optional embodiments of this application, but are not intended to limit this application. Any modification, equivalent replacement, or improvement made without departing from the principle of this application should fall within the protection scope of this application.

What is claimed is:

1. A system, comprising:
a first network device; and
a second network device, configured to:
   determine location information, wherein the location information comprises a location identifier and a plurality of associated flexible algorithms corresponding to the location identifier, and the location identifier identifies a location of the second network device in a network; and
   send the location information to the first network device; and
wherein the first network device is configured to:
   receive the location information; and
   generate, based on a first flexible algorithm, first routing information to the second network device, wherein the first flexible algorithm is one of the plurality of associated flexible algorithms, the first flexible algorithm corresponds to a first network topology, the first network topology is a network topology in which the first network device is located, and the first routing information is used to send a packet to the second network device in the first network topology; and
   generate, based on a second flexible algorithm, second routing information to the second network device, wherein the plurality of associated flexible algorithms further comprises the second flexible algorithm, the second routing information corresponds to a second network topology, the second network topology is a network topology in which the first network device is located, and the second routing information is used to send a packet to the second network device in the second network topology.

2. The system according to claim 1, wherein the first routing information corresponds to an identifier of the first network topology.

3. The system according to claim 1, wherein the first routing information comprises an identifier of the first network topology.

4. The system according to claim 1, wherein the plurality of associated flexible algorithms are carried in a type length value (TLV) field of the location information.

5. The system according to claim 4, wherein each flexible algorithm is a sub-TLV in the TLV field of the location information.

6. An apparatus, comprising:
at least one processor;
a non-transitory computer readable storage medium storing a program that is executable by the at least one processor, the program including instructions to:
   obtain a second packet;
   add an identifier of a first network topology to the second packet and an identifier of a first resource to the second packet, to obtain a first packet, wherein the first resource is a resource in the first network topology, and the identifier of the first resource indicates to send the first packet in the first network topology using the first resource, and wherein a network topology matching the first packet is the first network topology, and the first network topology is a network topology in which the apparatus is located;
determine first routing information based on the first network topology, wherein the first routing information is used to send the first packet in the first network topology; and
send the first packet based on the first routing information.

7. The apparatus according to claim 6, wherein the program includes instructions to:
add the identifier of the first network topology to a hop-by-hop (HBH) field of the second packet, to obtain the first packet.

8. The apparatus according to claim 6, wherein the program includes instructions to:
add a segment identifier comprising the identifier of the first network topology to a segment identifier list of the second packet, to obtain the first packet.

9. The apparatus according to claim 6, wherein the program includes instructions to:
determine, based on a destination address of the second packet, that a flexible algorithm matching the second packet is a first flexible algorithm, wherein the first flexible algorithm corresponds to the first network topology; and
determine that a network topology matching the second packet is the first network topology, or determine that a destination address of the second packet matches a preset destination address, wherein the preset destination address matches the first network topology; and
determine that a network topology matching the second packet is the first network topology.

10. The apparatus according to claim 6, wherein the program further includes instructions to:
receive the second packet; and
determine that the network topology matching the second packet is the first network topology.

11. The apparatus according to claim 10, wherein the program further includes instructions to:
determine, based on a destination address of the second packet, that a flexible algorithm matching the second packet is a first flexible algorithm, wherein the first flexible algorithm corresponds to the first network topology, and determine that the network topology matching the second packet is the first network topology; or
determine that a destination address of the second packet matches a preset destination address, wherein the preset destination address matches the first network topology, and determine that the network topology matching the second packet is the first network topology.

12. The apparatus according to claim 6,
wherein the program further includes instructions to send the first packet in the first network topology based on the first routing information and by using the first resource.

13. The apparatus according to claim 6, wherein the first routing information corresponds to the identifier of the first network topology; and
wherein the program includes instructions to determine the first routing information based on a correspondence between the first routing information and the identifier of the first network topology.

14. The apparatus according to claim 6, wherein the identifier of the first network topology is comprised in the first routing information; and wherein the program includes instructions to determine the first routing information based on the identifier of the first network topology comprised in the first routing information.

15. A first network device, comprising:

at least one processor; and a non-transitory computer readable storage medium storing a program that is executable by the at least one processor, the program including instructions to:

receive location information from a second network device, wherein the location information comprises a location identifier and a plurality of associated flexible algorithms corresponding to the location identifier, and the location identifier identifies a location of the second network device in a network;

generate, based on a first flexible algorithm, first routing information to the second network device, wherein the first flexible algorithm is one of the plurality of associated flexible algorithms, the first flexible algorithm corresponds to a first network topology, the first network topology is a network topology in which the first network device is located, and the first routing information is used to send a packet to the second network device in the first network topology; and generate, based on a second flexible algorithm, second routing information to the second network device, wherein the plurality of associated flexible algorithms further comprises the second flexible algorithm, the second routing information corresponds to a second network topology, the second network topology is a network topology in which the first network device is located, and the second routing information is used to send a packet to the second network device in the second network topology.

16. The first network device according to claim 15, wherein the first routing information corresponds to an identifier of the first network topology.

17. The first network device according to claim 15, wherein the first routing information comprises an identifier of the first network topology.

18. The first network device according to claim 15, wherein the plurality of associated flexible algorithms are carried in a type length value (TLV) field of the location information.

19. The first network device according to claim 18, wherein each flexible algorithm is a sub-TLV in the TLV field of the location information.

* * * * *